(12) United States Patent
Petersen

(10) Patent No.: US 7,604,198 B2
(45) Date of Patent: Oct. 20, 2009

(54) ROTORCRAFT HAVING COAXIAL COUNTER-ROTATING ROTORS WHICH PRODUCE BOTH VERTICAL AND HORIZONTAL THRUST AND METHOD OF CONTROLLED FLIGHT IN ALL SIX DEGREES OF FREEDOM

(76) Inventor: Bruce L. Petersen, 5710 Lenox Rd., Lisle, IL (US) 60532

( * ) Notice: Subject to any disclaimer, the term of this patent is extended or adjusted under 35 U.S.C. 154(b) by 0 days.

(21) Appl. No.: 10/672,003

(22) Filed: Sep. 25, 2003

(65) Prior Publication Data

US 2005/0067527 A1    Mar. 31, 2005

(51) Int. Cl.
    *B46C 27/08*    (2006.01)
(52) U.S. Cl. .................. 244/17.23; 244/17.25
(58) Field of Classification Search .............. None
    See application file for complete search history.

(56) References Cited

U.S. PATENT DOCUMENTS

| | | | | |
|---|---|---|---|---|
| 3,041,012 A | * | 6/1962 | Gibbs ..................... 244/17.23 |
| 3,470,765 A | * | 10/1969 | Campbell ................. 74/665 K |
| 3,507,461 A | * | 4/1970 | Rosta ...................... 244/17.23 |
| 4,478,379 A | * | 10/1984 | Kerr ........................ 244/17.11 |
| 4,589,611 A | * | 5/1986 | Ramme et al. ................. 244/6 |
| 4,787,573 A | * | 11/1988 | Pauchard ................. 244/17.23 |
| 4,828,205 A | * | 5/1989 | Durand .................... 244/17.23 |
| 6,308,912 B1 | * | 10/2001 | Kirjavainen ............... 244/12.2 |

* cited by examiner

*Primary Examiner*—Timothy D. Collins

(57) ABSTRACT

A rotorcraft and method for providing controlled flight which provides flight in all six degrees of freedom of pitch, roll, yaw, up/down, forward/rear, and left/right. The rotorcraft includes a fuselage with a pair of counter-rotating rotor blade assemblies each having a plurality of radially-extending airfoil shaped blades about a vertically disposed central axis. A rotor drive system mounted to the fuselage includes a motor or engine for rotationally driving the rotor blade assemblies. A rotor blade control system monitors the rotational location of each blade relative to the fuselage and allows a pilot to control respective vertical and horizontal thrust components of the blades corresponding to lift versus drag characteristics of the airfoils during rotation about the fuselage. This is done by changing the pitch angles of the blades and/or by utilizing respective flaps pivotally mounted to the blades to change the effective pitch angle of the blades.

26 Claims, 23 Drawing Sheets

Figure 1:
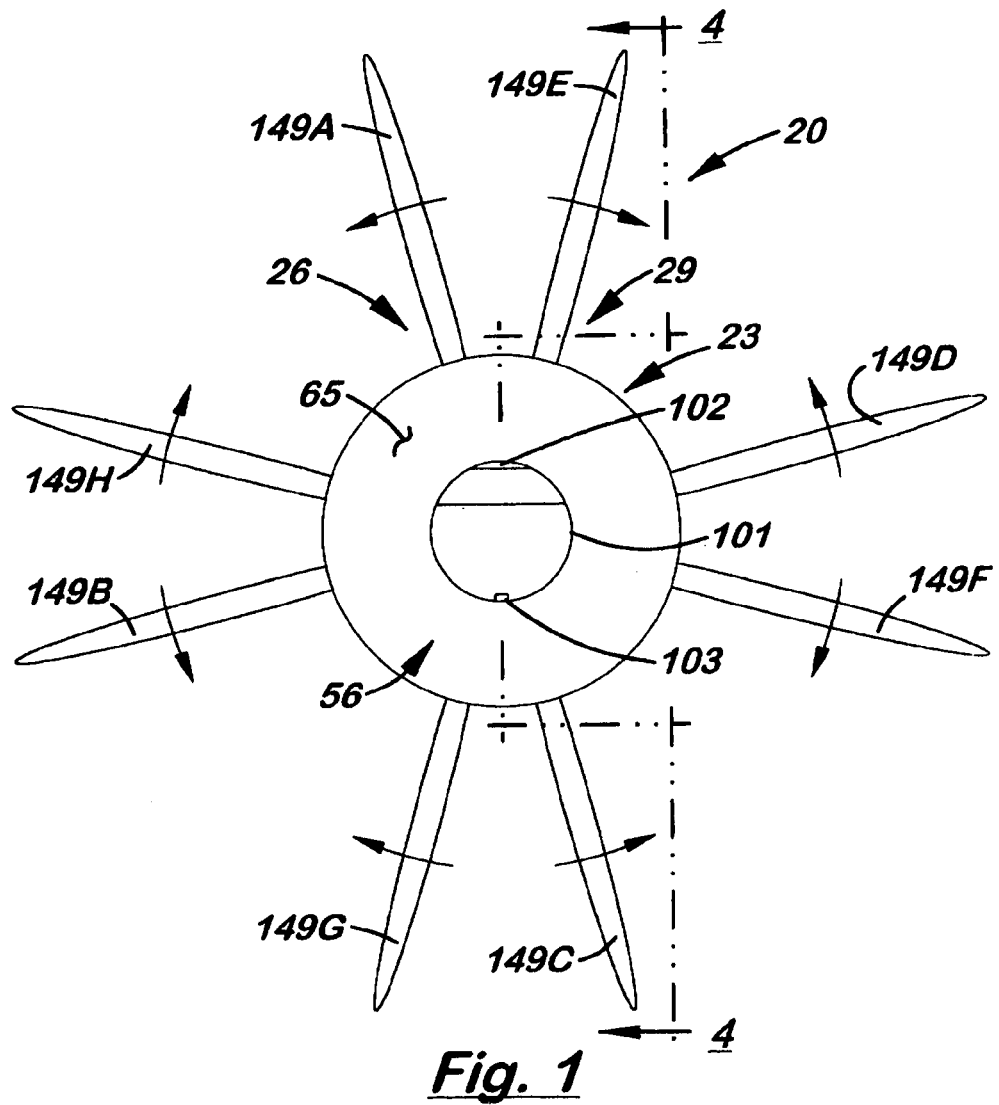

ROTORCRAFT HAVING COAXIAL COUNTER-ROTATING ROTORS WHICH PRODUCE BOTH VERTICAL AND HORIZONTAL THRUST AND METHOD OF CONTROLLED FLIGHT IN ALL SIX DEGREES OF FREEDOM

BACKGROUND OF THE INVENTION

1. Field

The present invention relates generally to helicopters, vertical take-off and landing (VTOL) aircraft, and other rotorcraft which utilize horizontally disposed rotors to provide lift, and more specifically to such rotorcraft which utilize pairs of counter-rotating rotors to offset engine torque rather than a vertically disposed tail rotor.

2. State of the Art

Helicopters, VTOL aircraft, and other rotorcraft which are capable of vertical take-offs and landings are well known in the prior art. Extensive research and development has particularly been conducted particularly regarding helicopters over the last few decades. Advances in the area of drive systems, rotors, aerodynamics, and the like have made the helicopters a reliable form of transportation particularly used in the various branches of the military and the Coast Guard.

Conventional helicopters develop lift or vertical thrust during flight by continuously driving air downwardly using a single horizontally disposed main rotor which includes on a main rotor shaft with two or more radially extending airfoil shaped main rotor blades extending from a rotor head or central hub affixed to the upper end of the main rotor shaft. The vertical thrust generated by the main rotor is controlled by increasing or decreasing the rotational speed of the main rotor and by adjusting the pitch of the main rotor blades using a swash plate type pitch control mechanism disposed at the hub. A tail rotor of a much smaller size having two or more radially extending airfoil shaped blades is vertically disposed aft of the main rotor to offset engine torque which otherwise causes the fuselage of the helicopter to rotate in an opposite rotational direction from that of the main rotor. The tail rotor is typically driven at a constant rotational speed relative to the main rotor. Therefore, the pitch of the tail rotor blades is adjustable to provide the required horizontal thrust to resist engine torque rotating the main rotor and to provide directional control of the helicopter. Horizontal thrust to propel the helicopter forward, rearward, and sideways is achieved by changing the pitch angle of the blades during rotation about the fuselage of the helicopter using the pitch control mechanism.

Helicopters have been developed which utilize a pair of counter-rotating main rotors which offset the engine torque such that the tail rotor may be eliminated. Such helicopters include those with rotors having separate vertical axes of rotation which are longitudinally displaced on the fuselage such as used in the military. Others have rotors which are laterally displaced with axes of rotation. Some such helicopters have rotors which are completely separated in non-overlapping manner. Others have rotors that are tilted slightly laterally off vertical with blades that overlap. The blades are timed to interleave during rotation so as not to collide. Some helicopters have rotors which have a common vertical axis of rotation, which are hereinafter referred to as rotorcraft.

An example of a helicopter having rotors which are laterally displaced is disclosed in U.S. Pat. No. 4,771,967 issued to Geldbaugh. The helicopter has a pair of laterally displaced rotors which rotate in opposite directions. A wing structure is disposed above and below the blades which forms a leading edge ahead to the rotors to shelter the portion thereof moving with the air stream when the helicopter is in forward flight. A compressed gas ejection system aids in the transition of respective blades of the rotors operating in the air stream to operating within the sheltered wing structure. A louver system in the wing structure allows air to freely flow through the wing structure during the lift-off or hovering modes of the helicopter. The entire wing structure and rotors can be maneuvered as a unit so that the flight characteristics are similar to a conventional helicopter.

An example of a rotorcraft propelled by counter-rotating rotors is disclosed in U.S. Pat. No. 5,064,143 issued to Bucher. The rotorcraft has a pair of rotors driven to counter-rotate within a housing. The housing has adjustable air guiding discuss for the rotor stream and an airfoil-like outer shape to generate lift at horizontal flight. The air guiding devices include a circular arrangement of a plurality of individual sectors having tangentially extending blades arranged in a zone below the rotors. In each sector the blades are adjustable in their position relative to the rotor stream. In at least some of the sectors, the blade are arranged in pairs for an adjusting movement in opposite relative sense. The air guiding devices permit the pilot to control maneuvering of the rotorcraft.

Another example of a rotorcraft propelled by counter-rotating rotors is disclosed in U.S. Pat. No. 6,293,492 issued to Yanagisawa. The one-man rotorcraft has a drive transmission which transmits power from an engine to the upper and lower rotors comprised of respective first and second planet gear mechanisms provided with a common carrier. When the common carrier is rotated by an electric motor, a differential motion is generated between the two planet gear mechanisms which results in the rotors being rotated at different velocities to control yaw of the rotorcraft. A fore-and-aft swing mechanism and right-and-left swing mechanism depend from a lower end of a vertical shaft on which the rotors are supported. Moving a downwardly dependent control stick forward, backward, and side-to-side tilts the vertical shaft in the desired orientation per pilot input to the control stick to maneuver the rotorcraft. The control stick returns to a neutral position when subjected to a controlling force by the pilot.

Other types of aircraft have been developed as well. One example is in U.S. Pat. No. 6,113,029 issued to Salinas wherein is disclosed an aircraft capable of hovering and conventional flight. Vertical lift in the aircraft is produced by driving a column of air downwardly through an annular thrust flow channel formed in a fuselage of the aircraft. The fuselage has an aerodynamic shape which produces lift during forward flight like a conventional wing. The thrust flow channel has a flow control mechanism which directs the air flow according to pilot input between a vertical orientation to provide vertical lift during hovering flight and an angled orientation to provide both the vertical lift and a horizontal thrust for producing forward, rearward, and side-to-side flight.

In U.S. Pat. No. 6,254,032 issued to Bucher is disclosed an aircraft having a central cabin disposed in the center of a circular wing. Several electric drive units with rotors are pivotally disposed in an annular gap between the cabin and the ring. The drive units are pivoted downwardly to provide vertical lift and pivoted more horizontally to generate both lift and forward thrust. Attitude and movements of the aircraft are controlled by individual or group adjustment of the pivotal position of the drive units and rotors.

The major problem with the prior art helicopters, rotorcrafts, and other aircraft is the lack of controllability. None of the prior art helicopters, rotorcrafts, and aircraft are capable of flight in all six degrees of freedom or combinations thereof. This means all of the possible flight movements of: 1) pitch;

2) roll; 3) yaw; 4) up/down; 5) forward/rear; and 6) left/right. Therefore, maneuvering is always a compromise based on the performance capabilities of the particular helicopter, rotorcraft, or aircraft. This is particularly critical where flying space is at a premium such as during low hovers and flight adjacent obstructions such as buildings, bridges, towers, and sides of mountains.

There are a number of other problems with the prior art helicopters, rotorcrafts, and other aircraft, depending on the particular type of craft involved. For example, in helicopters and some rotorcraft the pitch control mechanism required to change the pitch of the main rotor blades is very complex and prone to mechanical failure, and excessive stresses are sometimes placed on the main rotor shaft, the pitch control mechanism, and the rotor blades during flight maneuvers which is also a source of mechanical failure. All such prior art helicopters, rotorcrafts, and other aircraft to varying degrees are difficult to control due to the large volume of air, or downwash, pushed downwardly by the rotor blades which causes excessive air turbulence which requires constant corrections and compensation for the turbulence. This is particularly troublesome when the downwash of the rotor blades is directed onto a closely disposed surface such as during takeoff, landing, and hovering close to the ground, and maneuvering by the side of a vertical structure such as buildings or a mountain such as during mountain rescue work. This is also troublesome when flying through the downwash of the helicopters, rotorcrafts, or other aircraft. Finally, the cabin of a helicopter must be relatively small and streamlined to minimize drag from the downwash produced by the blades of the main rotor.

There is a need for a rotorcraft which solves these problems with prior art helicopters, rotorcrafts, and other aircraft.

SUMMARY OF THE INVENTION

The present invention is a rotorcraft which provides controlled flight in all six degrees of freedom, a rotor system for rotorcraft, and a method for providing flight for rotorcraft.

The rotorcraft includes a fuselage and at least two rotor blade assemblies rotatably mounted to the fuselage about a vertically disposed central axis. Each rotor blade assembly has a plurality of radially-extending airfoil shaped blades adapted to produce variable vertical and horizontal thrust components during operation. A rotor drive system is mounted to the fuselage which includes a power device adapted for rotationally driving the rotor blade assemblies in opposite rotational directions. A rotor blade control system operatively connected to the blades adapted to control the vertical and horizontal thrust components of the blades of the rotor blade assemblies. The rotor blade control system includes a controller adapted to monitor the rotational location of each blade relative to the fuselage and input signals indicative of required vertical and horizontal thrust components of each blade to blade control devices adapted to change said vertical and horizontal thrust components of said blades throughout each revolution of each blade about the fuselage. A flight control input device operable by a pilot of the rotorcraft is adapted to input desired changes in direction, altitude, and attitude of the rotorcraft to the controller of what maneuvers are desired by the pilot. The input signals from the controller to the rotor blade control system include adjustments to the vertical and horizontal thrust components of each blade to execute the desired maneuvers of the rotorcraft.

Control of the vertical and horizontal thrust components of each blade maybe effected by the blades being pivotable about respective longitudinal axes to adjust a pitch angle thereof relative to a rotational plane of the rotor blade assembly. Control of the vertical and horizontal thrust components of each blade may also be effected by the blades having respective flaps pivotally mounted thereto to adjust an effective pitch angle of the blades relative to the rotational plane of the rotor blade assembly.

The rotor system for rotorcraft includes at least two of the rotor blade assemblies rotatably mountable to the rotorcraft, the rotor drive system mounted to the rotorcraft for rotationally driving the rotor blade assemblies, the rotor blade control system, the controller, and the flight control input device.

The method for providing flight for rotorcraft in all six degrees of freedom includes the steps of: 1) providing a rotorcraft having at least two rotor blade assemblies which are rotatable about a vertically disposed central axis, each rotor blade assembly having a plurality of radially-extending airfoil shaped blades of variable horizontal and vertical thrust components; 2) powering the rotor blade assemblies to rotate in opposite rotational directions to effect flight of the rotorcraft; and 3) controlling the horizontal and vertical thrust components of each blade throughout each revolution about the rotorcraft to execute desired maneuvers of the rotorcraft. The step of controlling the horizontal and vertical thrust components may be effected either by varying respective pitch angles of the blades about respective longitudinal axes of the blades relative to a rotational plane of the rotor blade assembly or by varying respective effective pitch angles of the blades by moving respective flaps pivotally mounted to the blades disposed generally parallel to respective longitudinal axes of the blades relative to a rotational plane of the rotor blade assembly.

THE DRAWINGS

Figure 2:
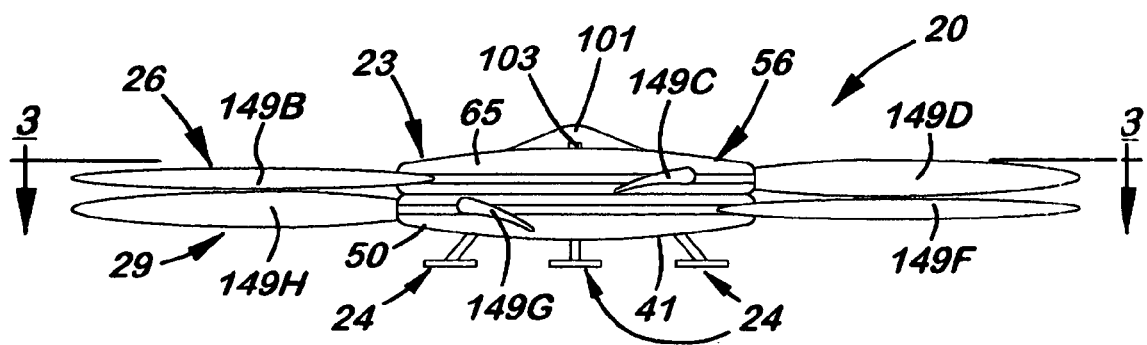
Figure 3:
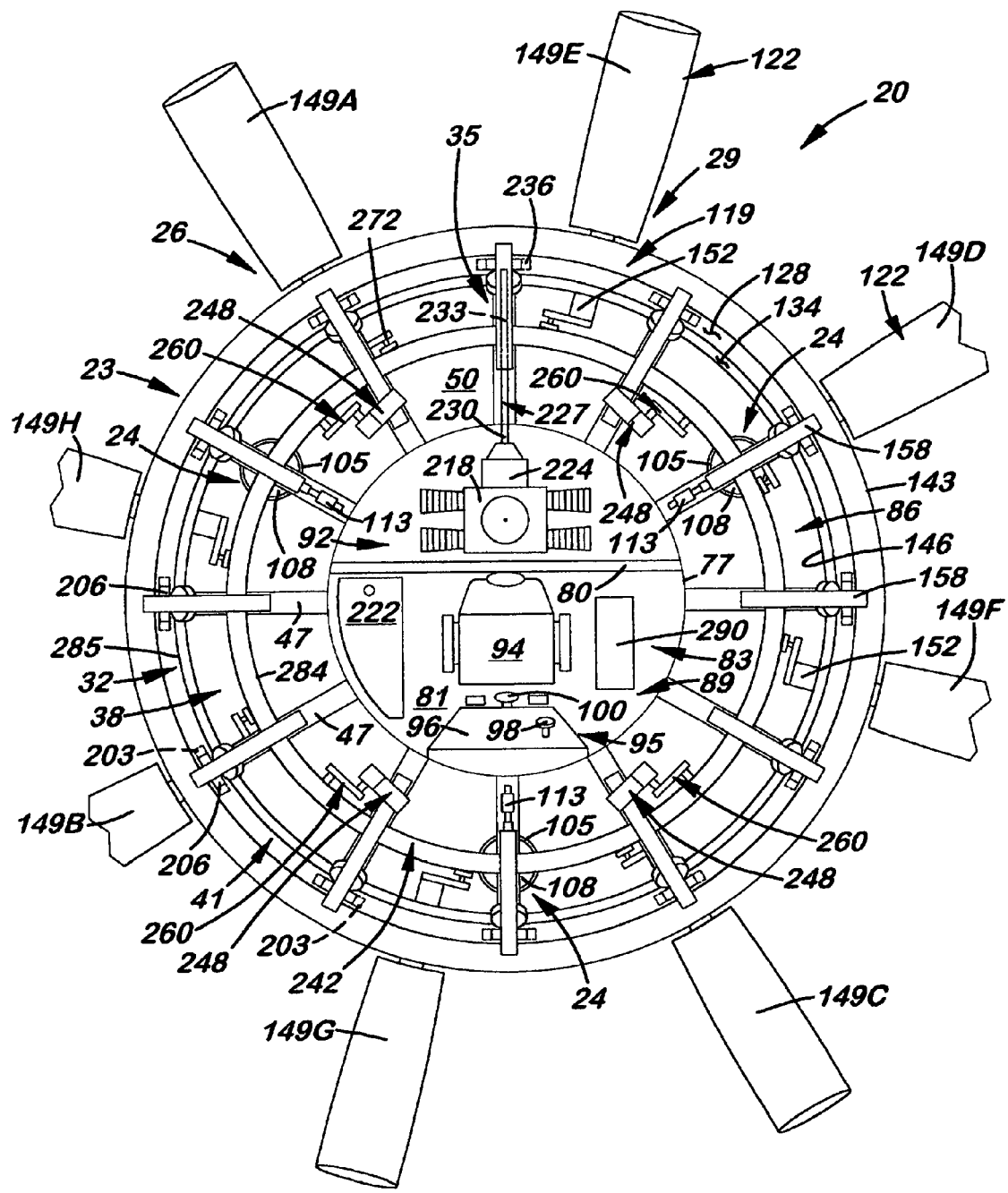
Figure 4:
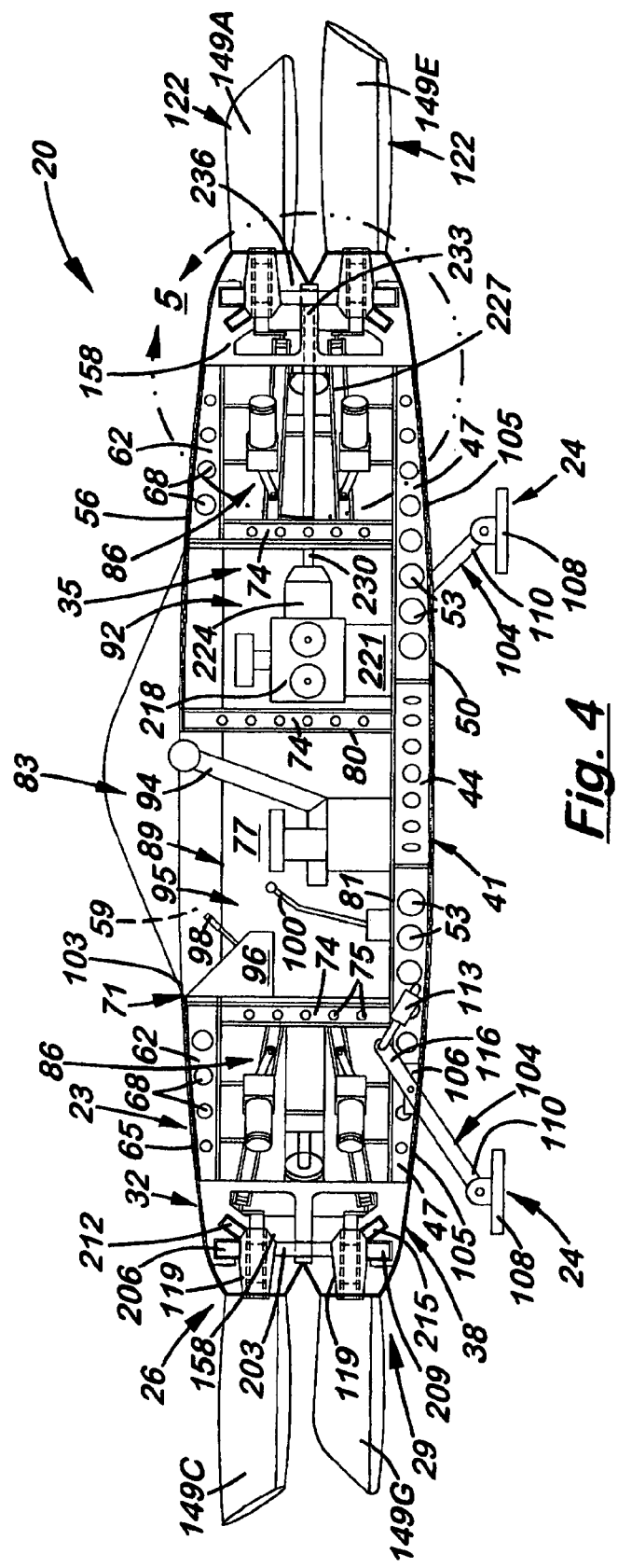
Figure 5:
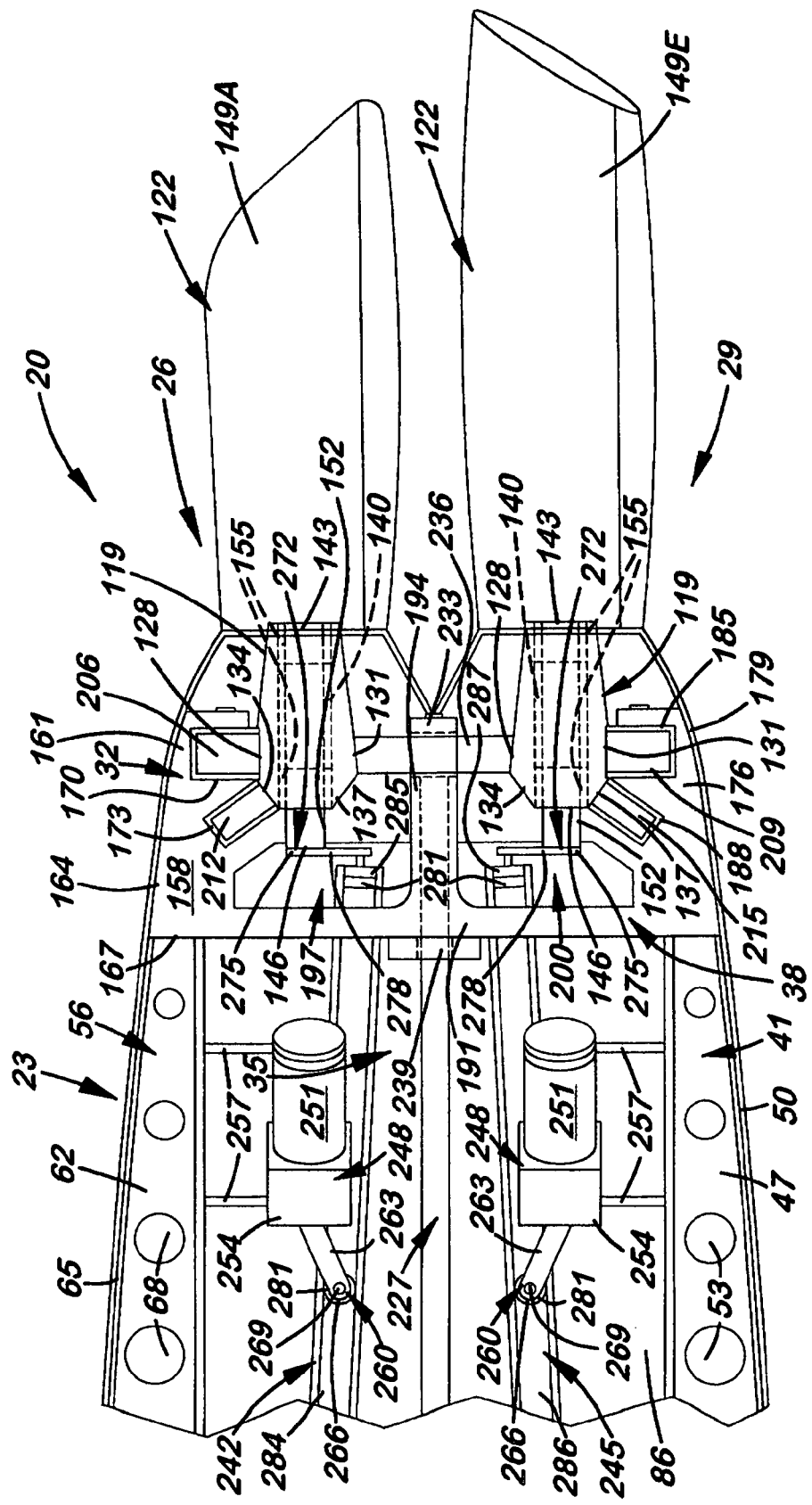
Figure 6:
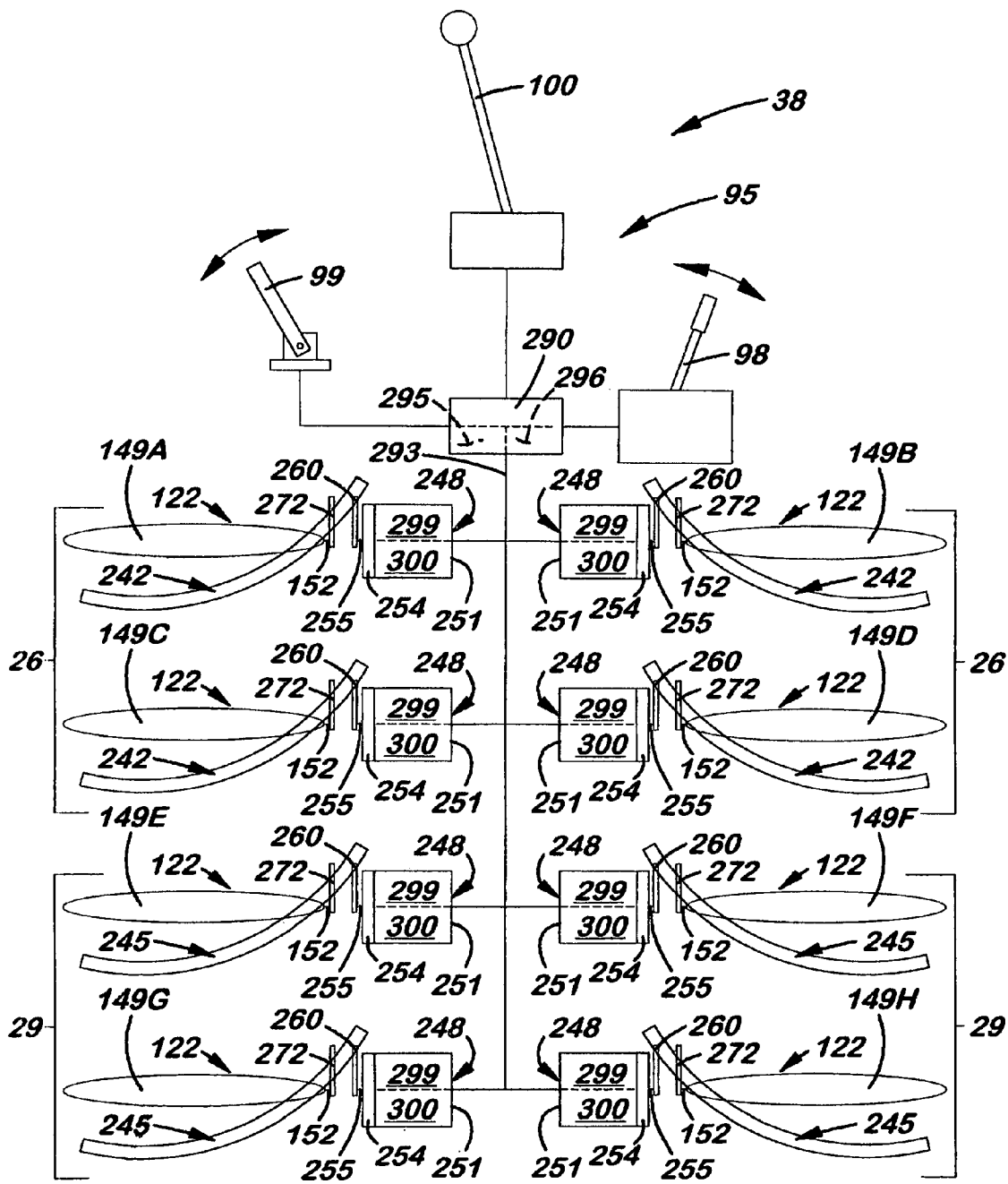
Figure 7:
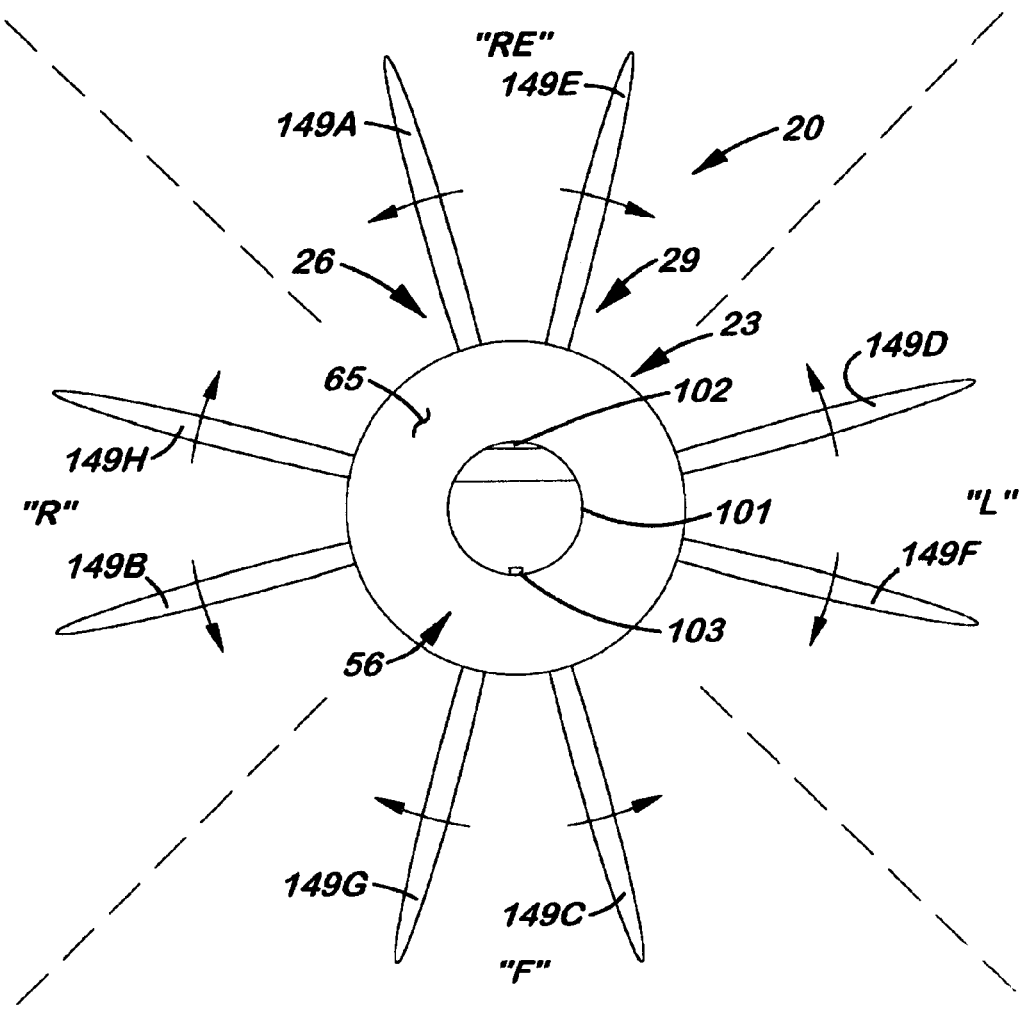
Figure 8:
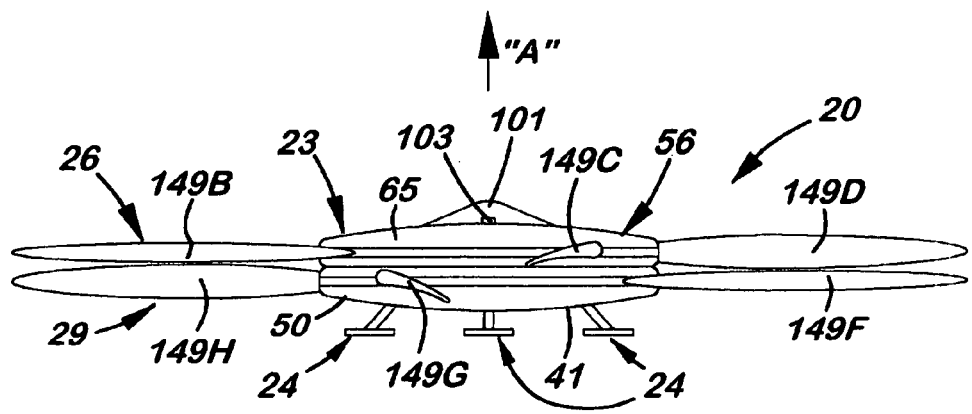
Figure 9:
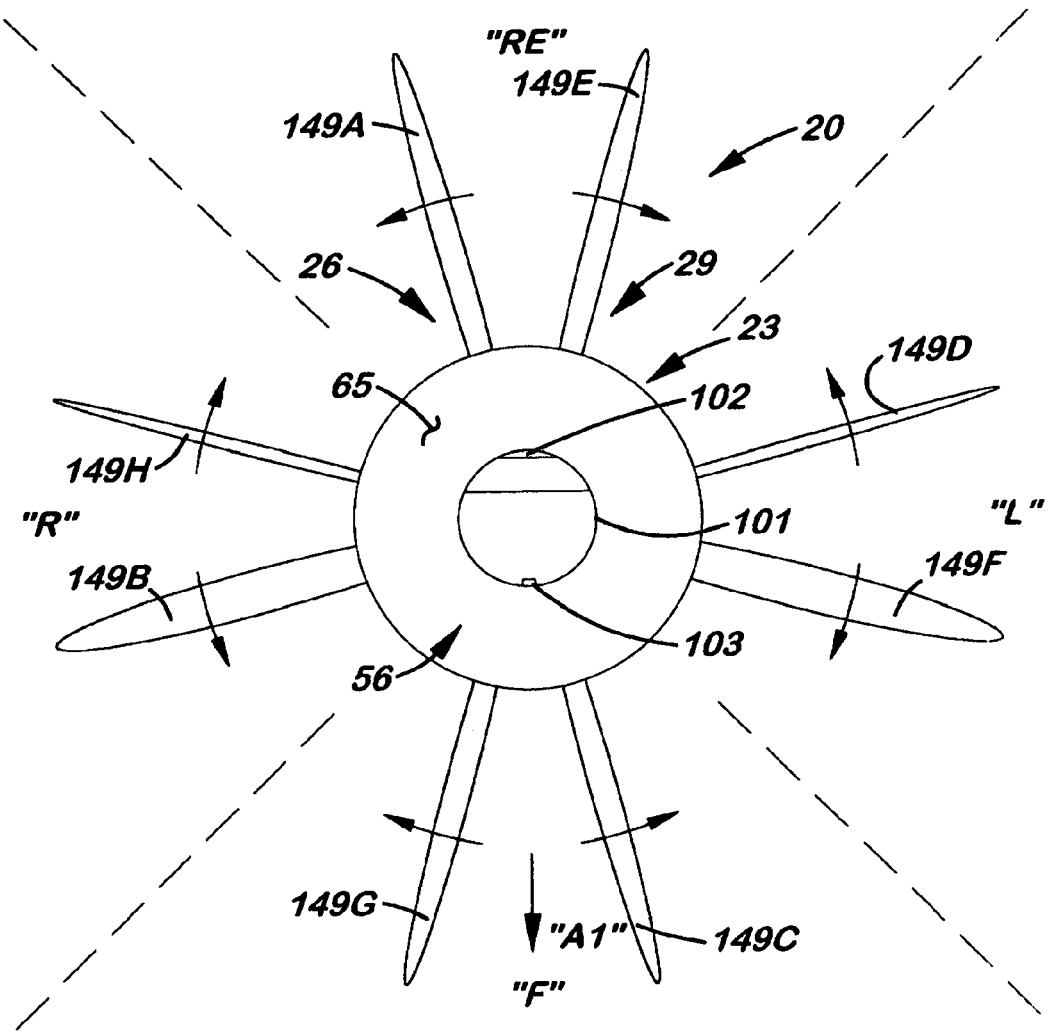
Figure 10:
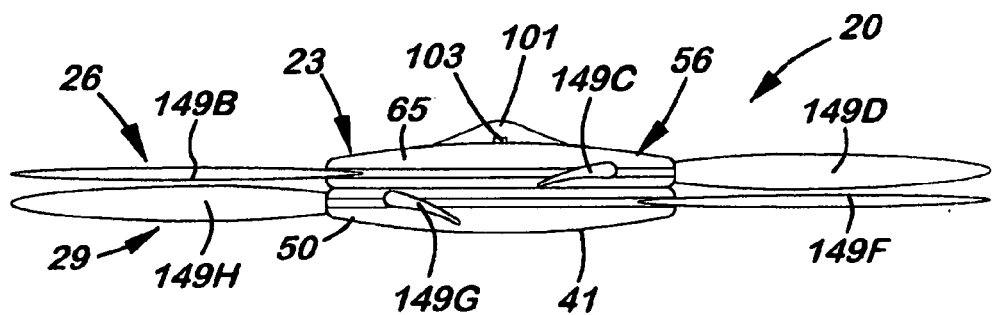
Figure 11:
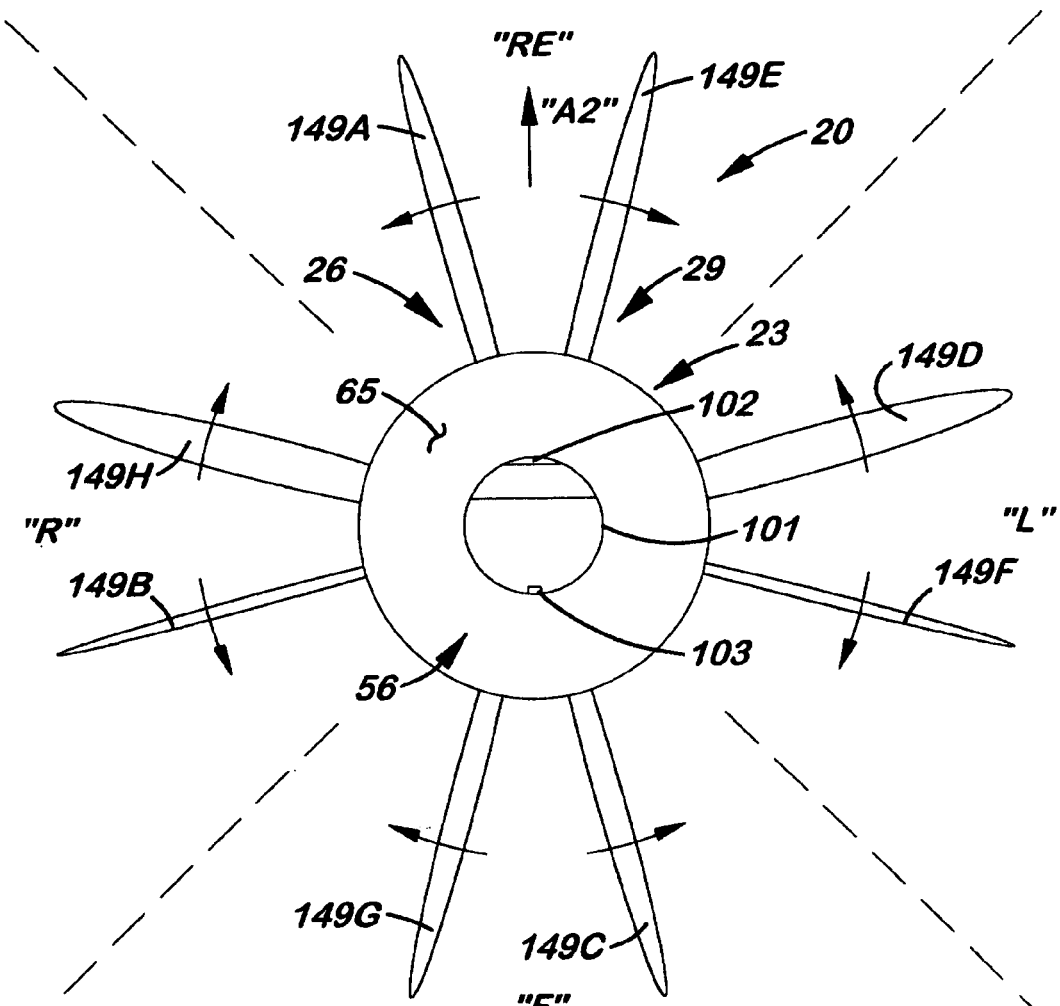
Figure 12:
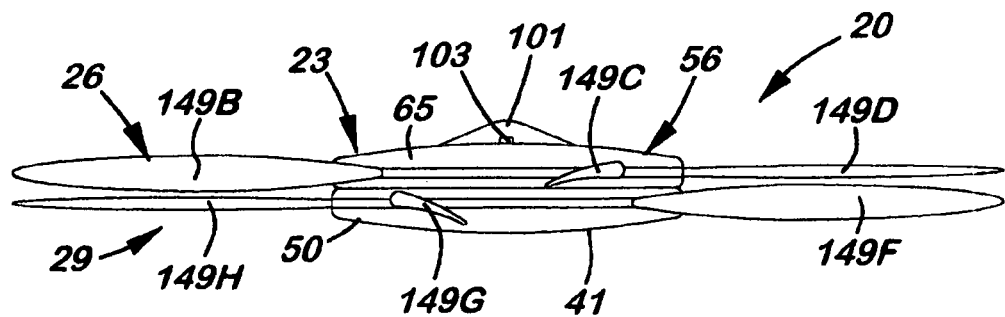
Figure 13:
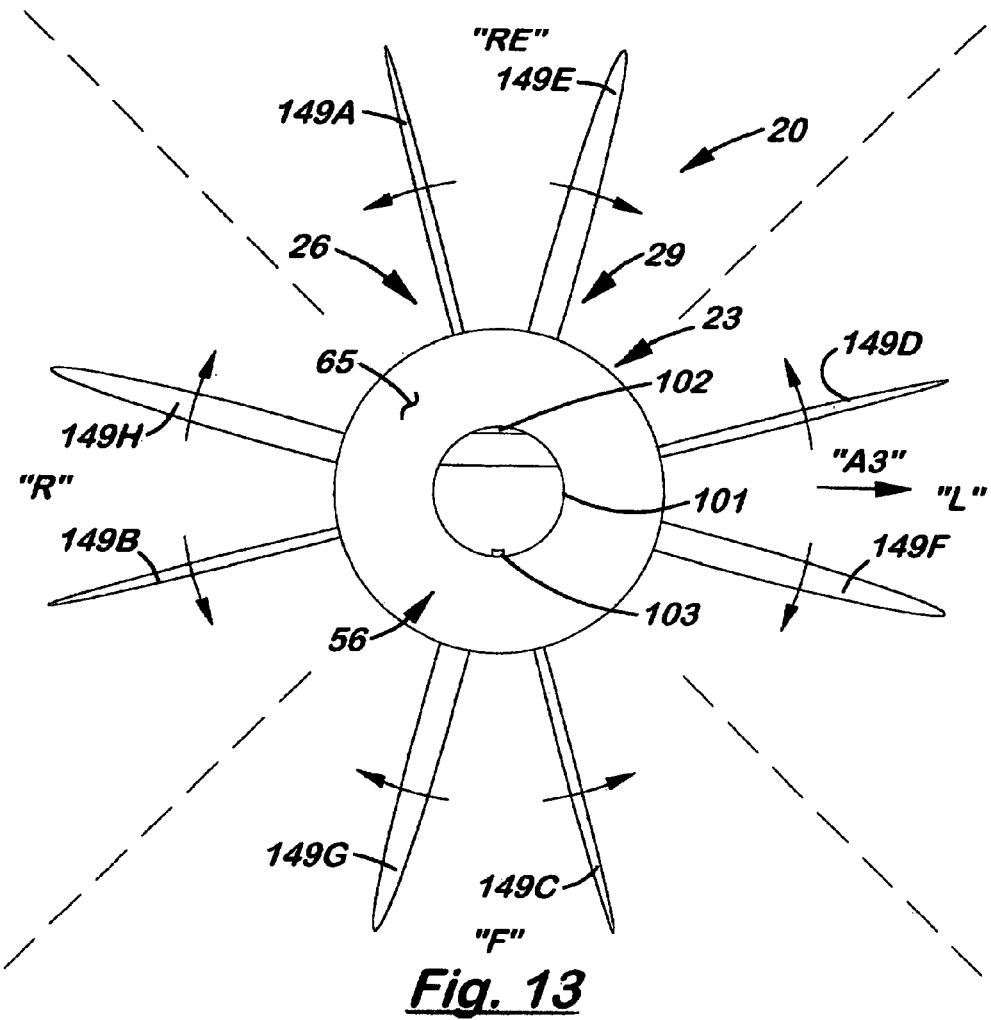
Figure 14:
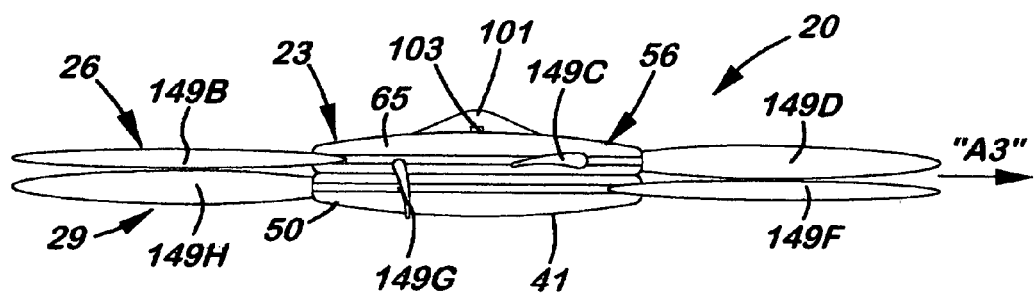
Figure 15:
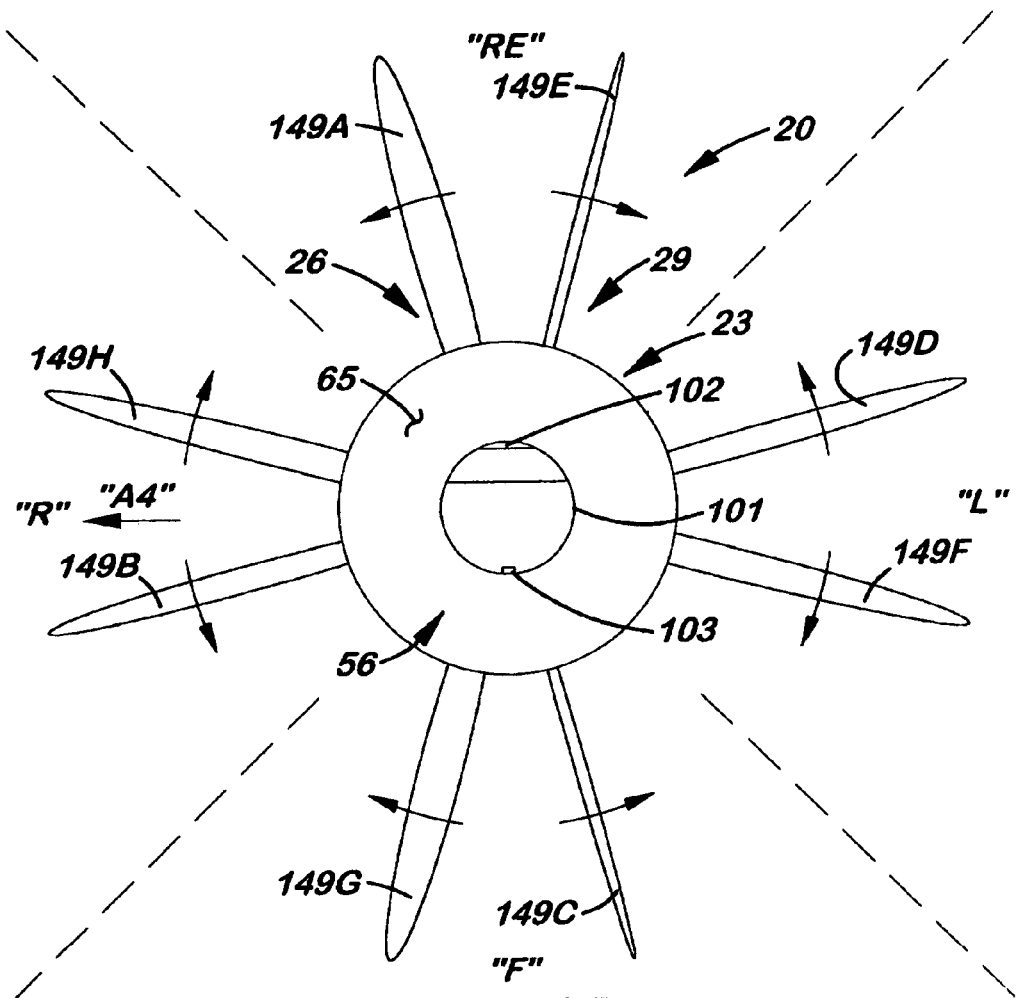
Figure 16:
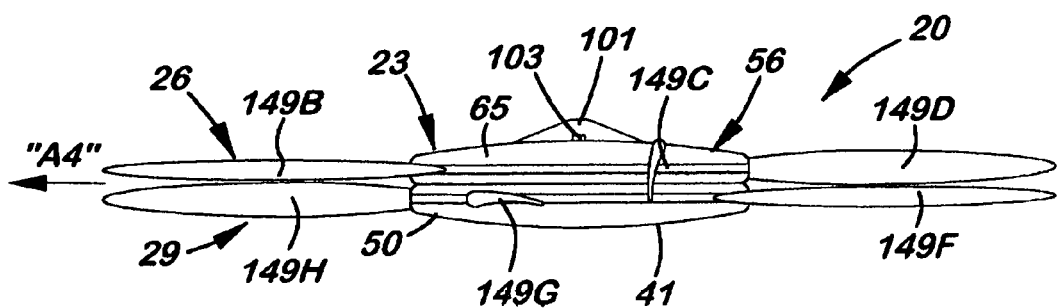
Figure 17:
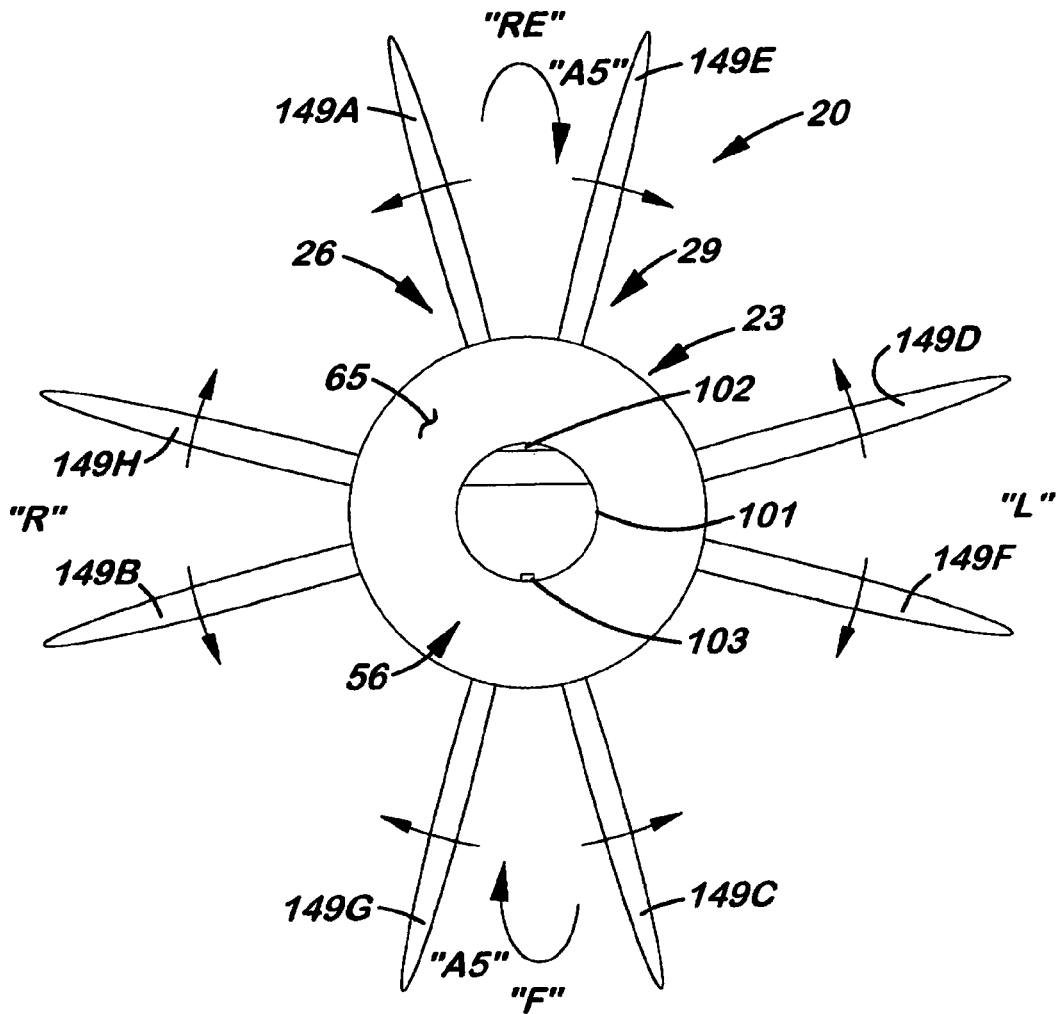
Figure 18:
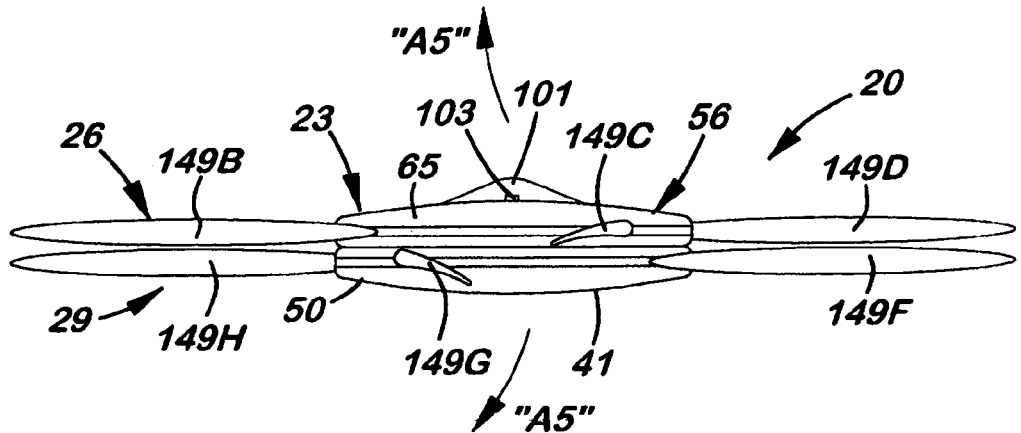
Figure 19:
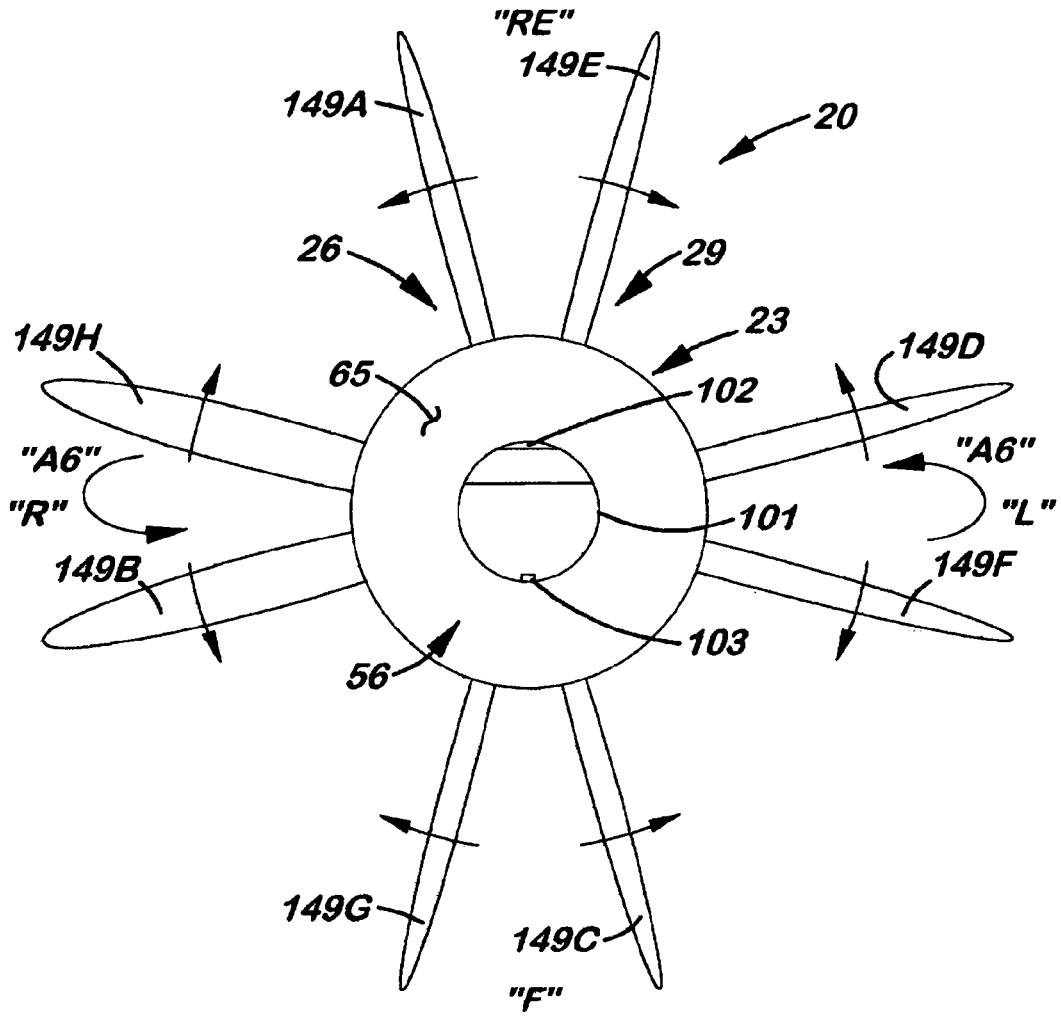
Figure 20:
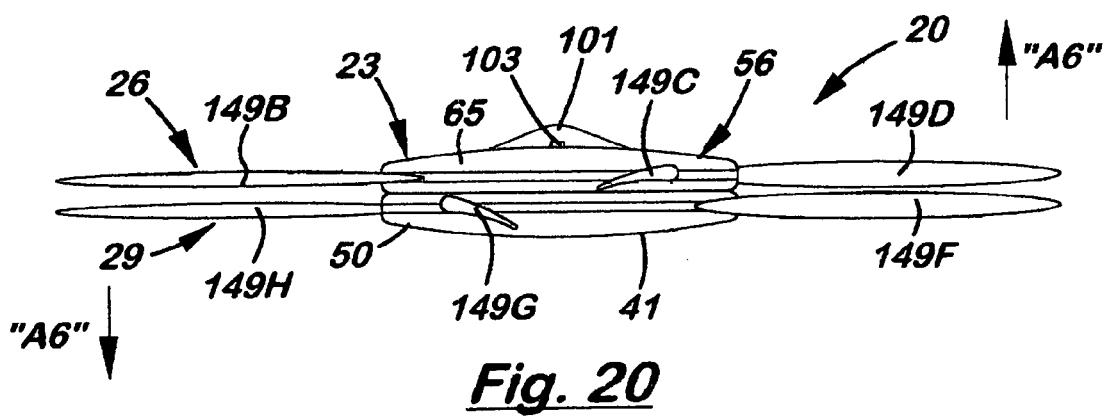
Figure 21:
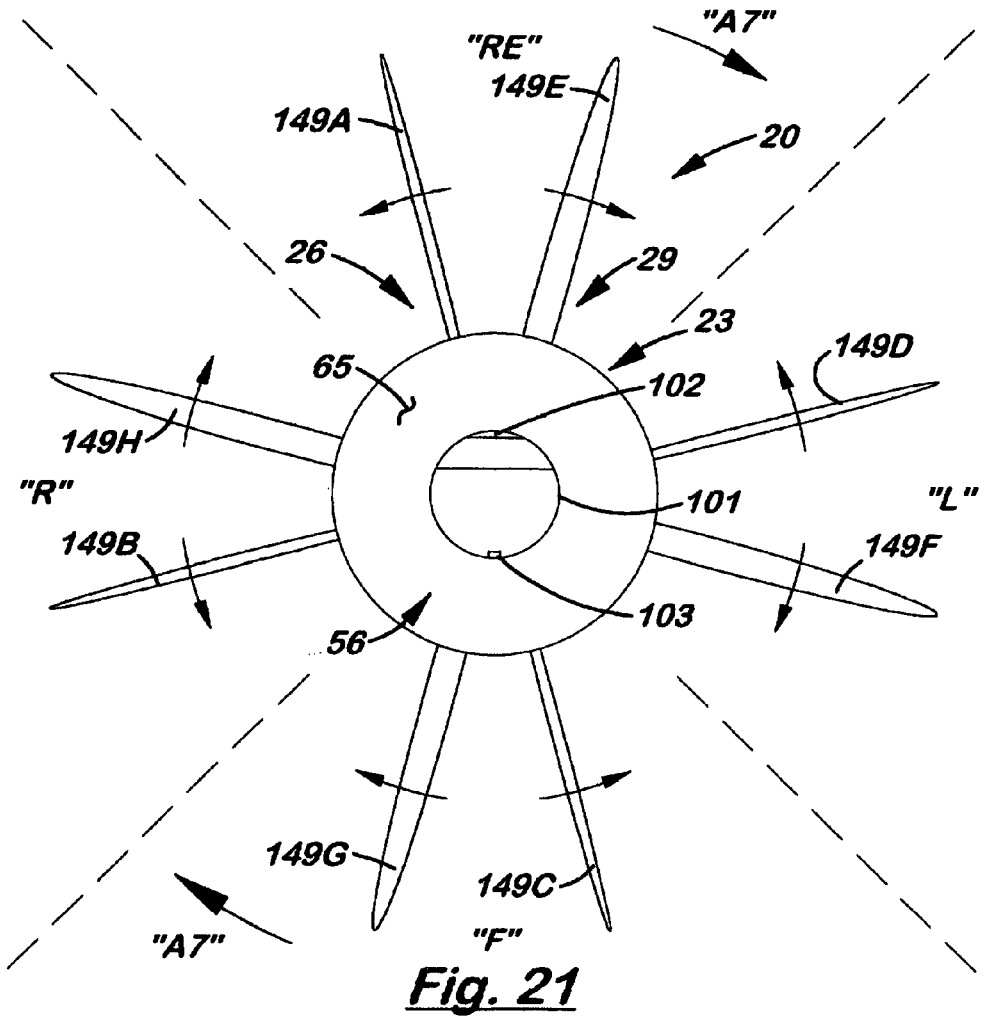
Figure 22:
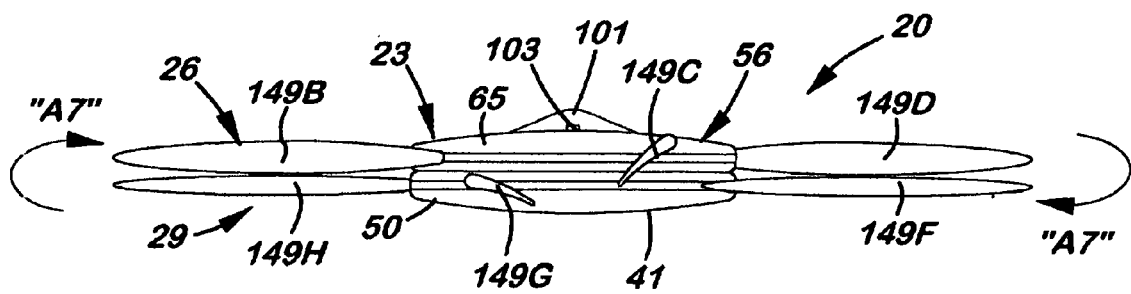
Figure 23:
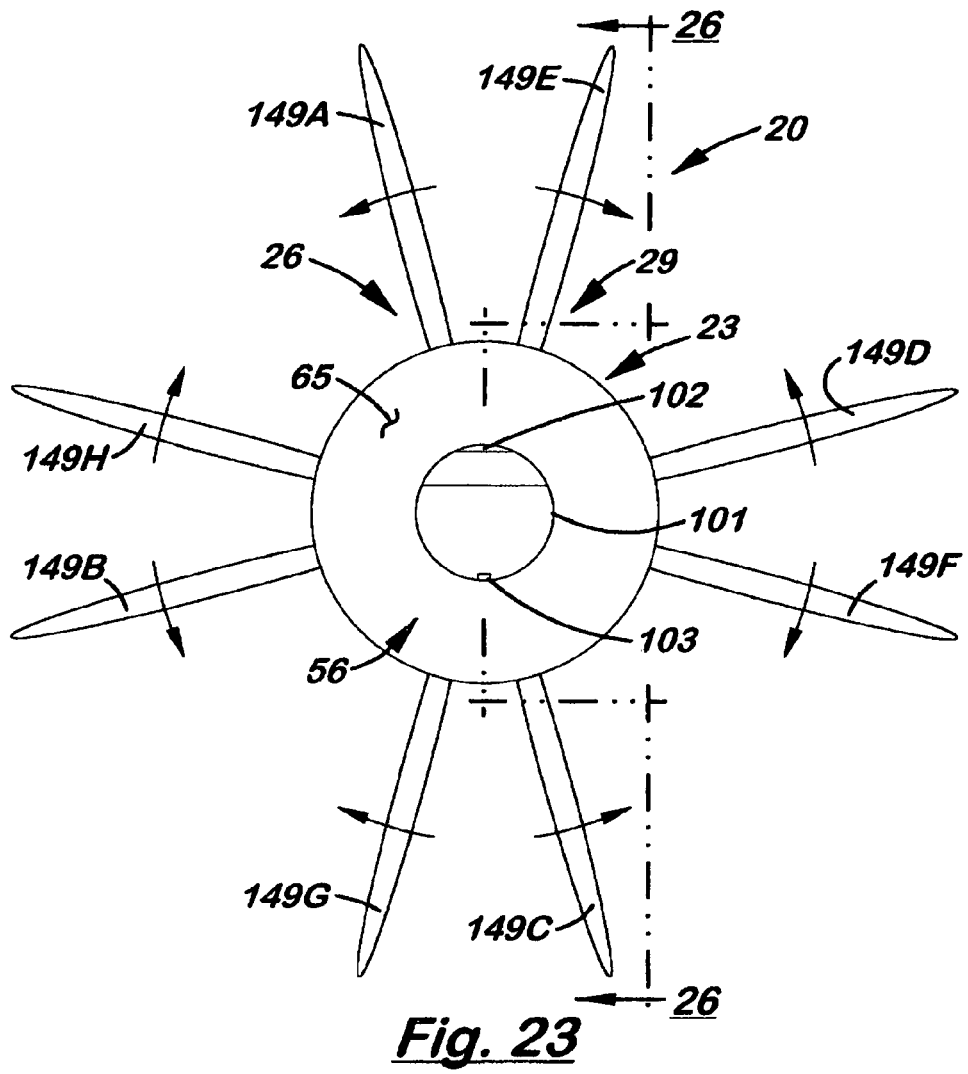
Figure 24:
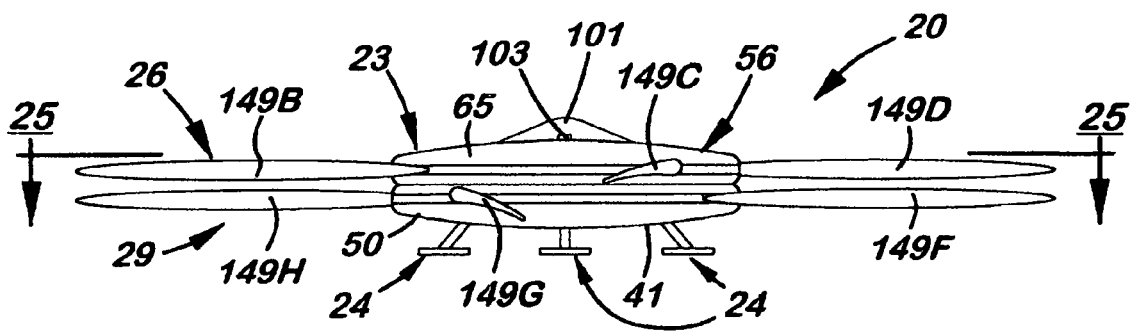
Figure 25:
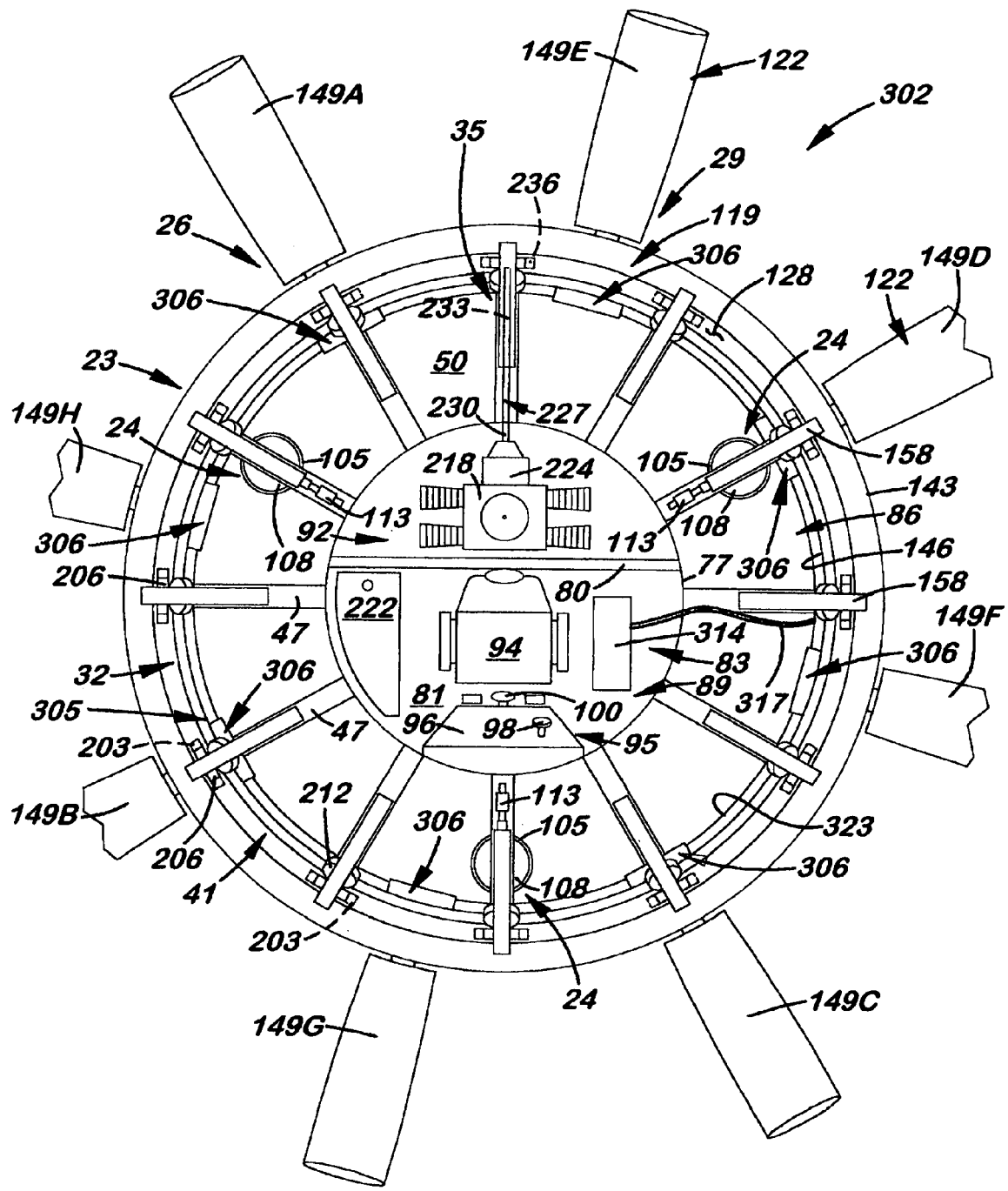
Figure 26:
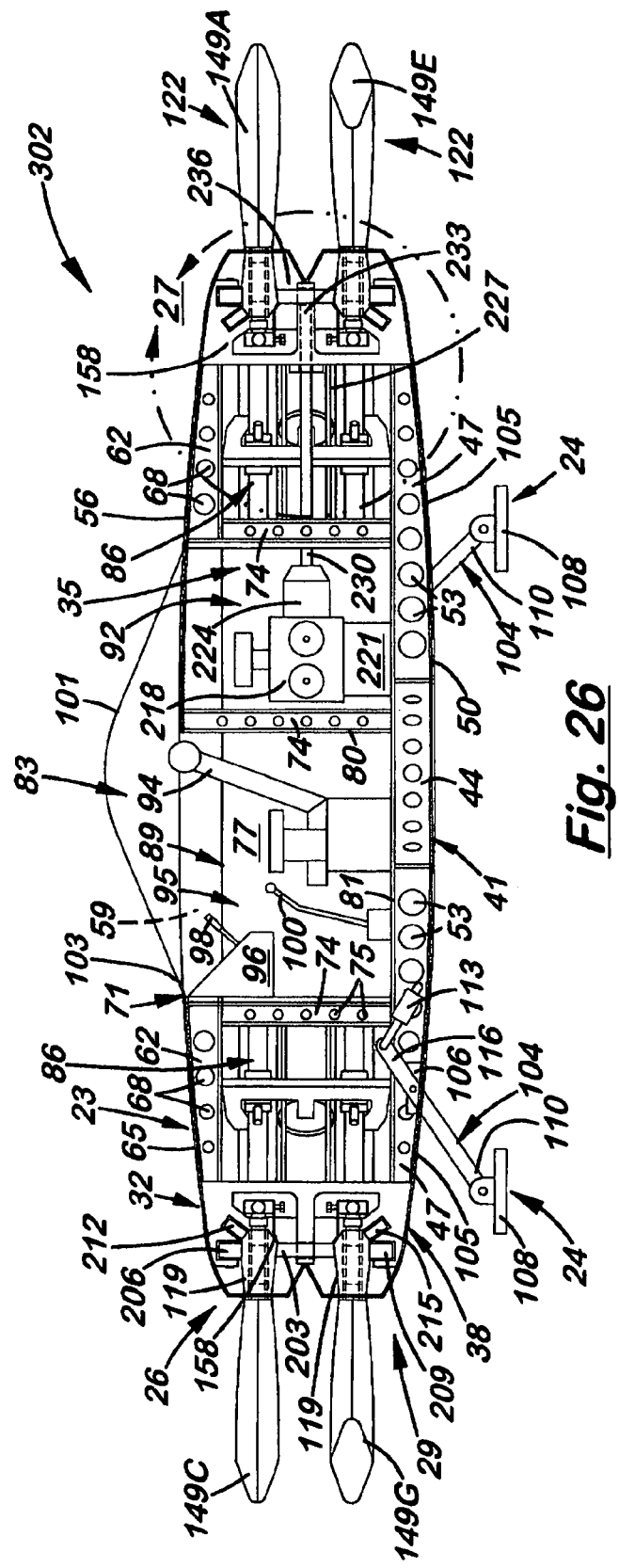
Figure 27:
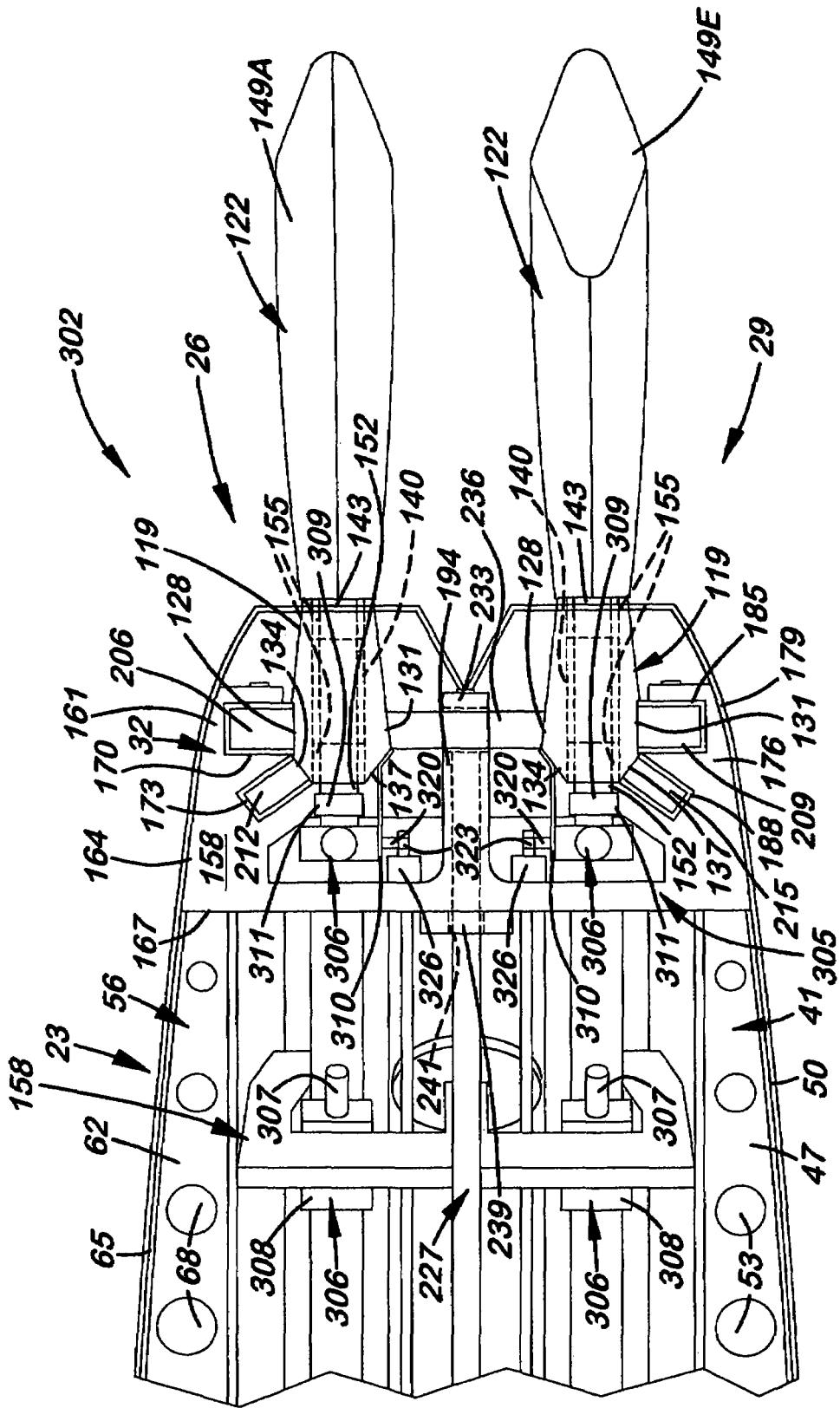
Figure 28:
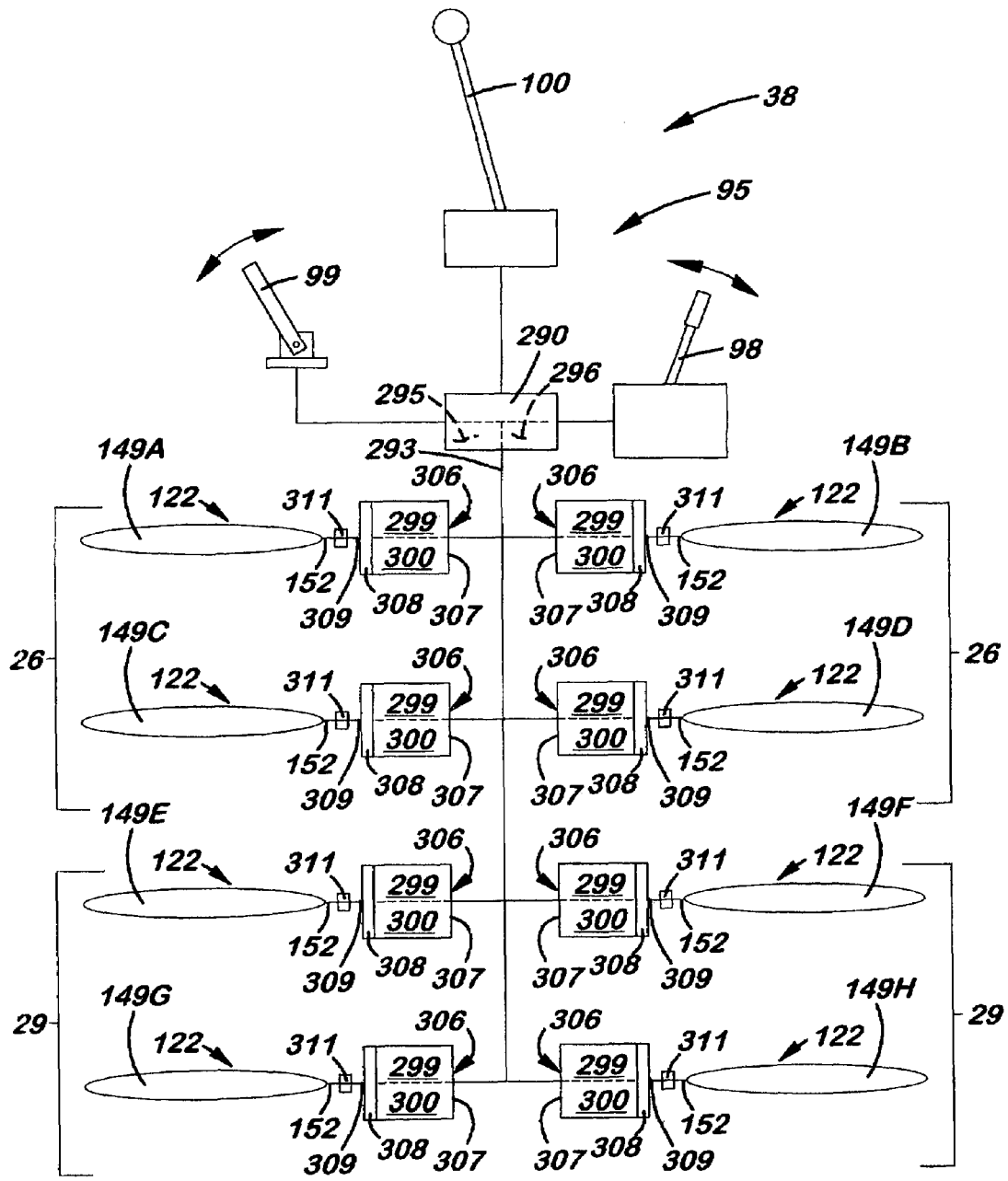
Figure 29:
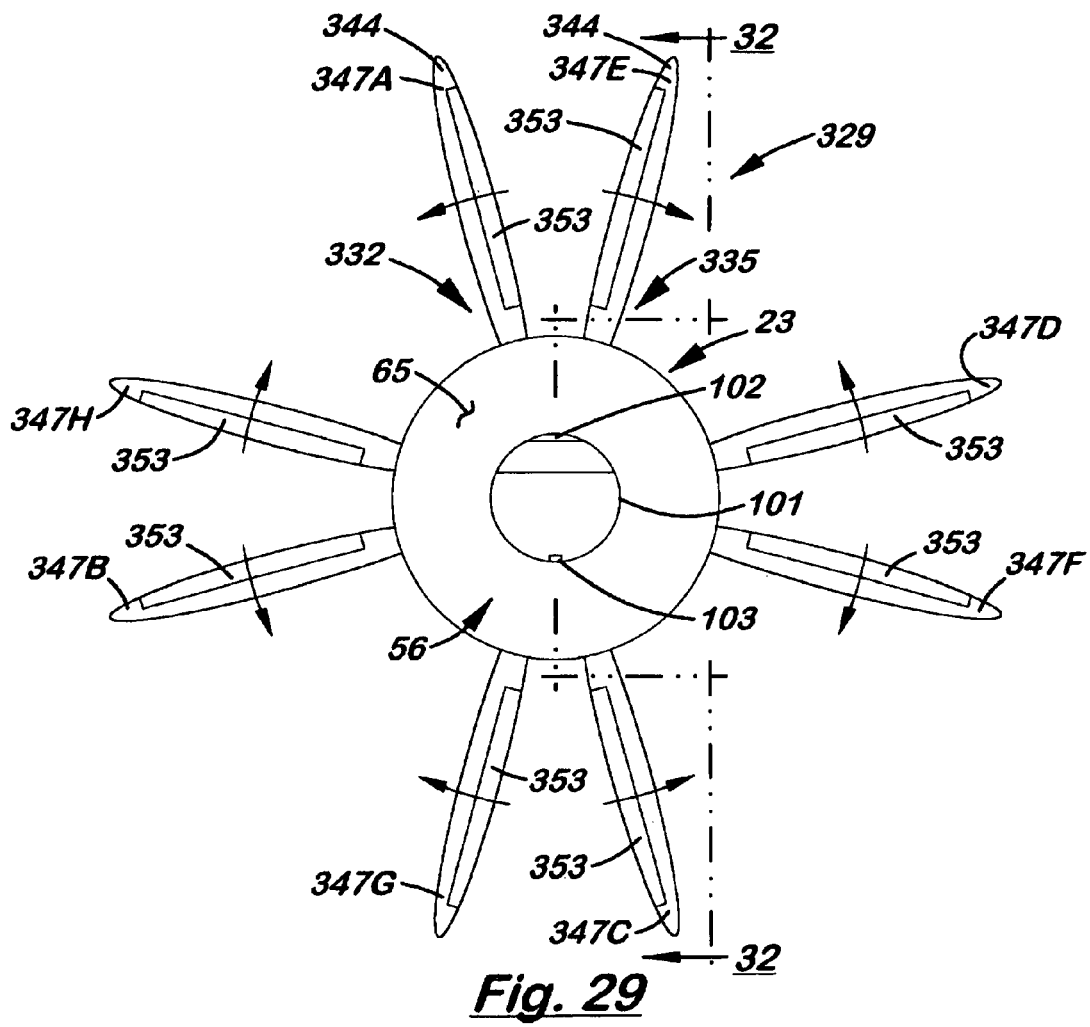
Figure 30:
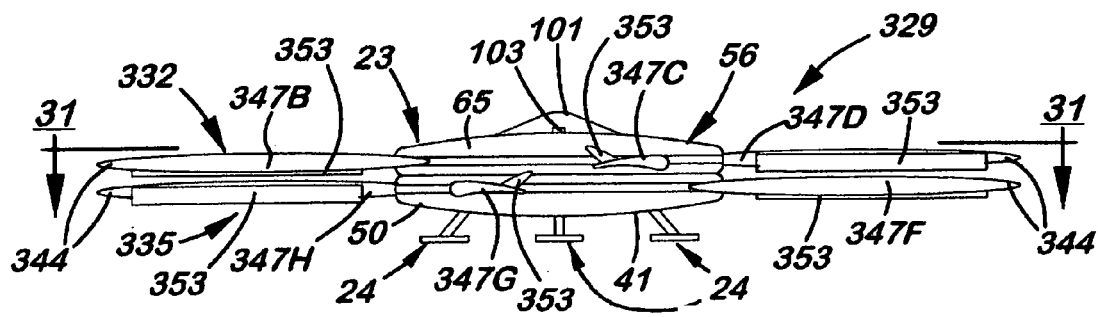
Figure 31:
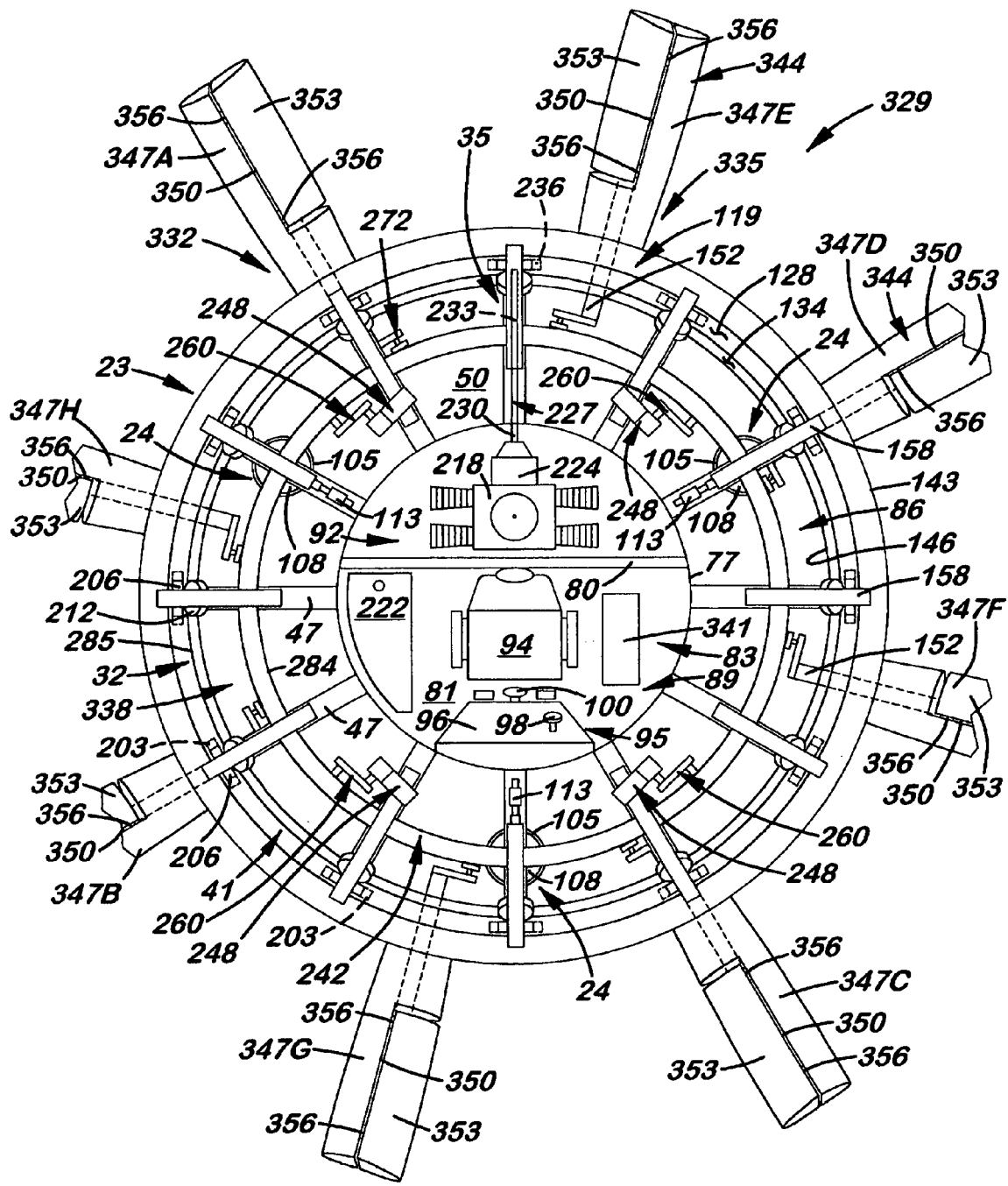
Figure 32:
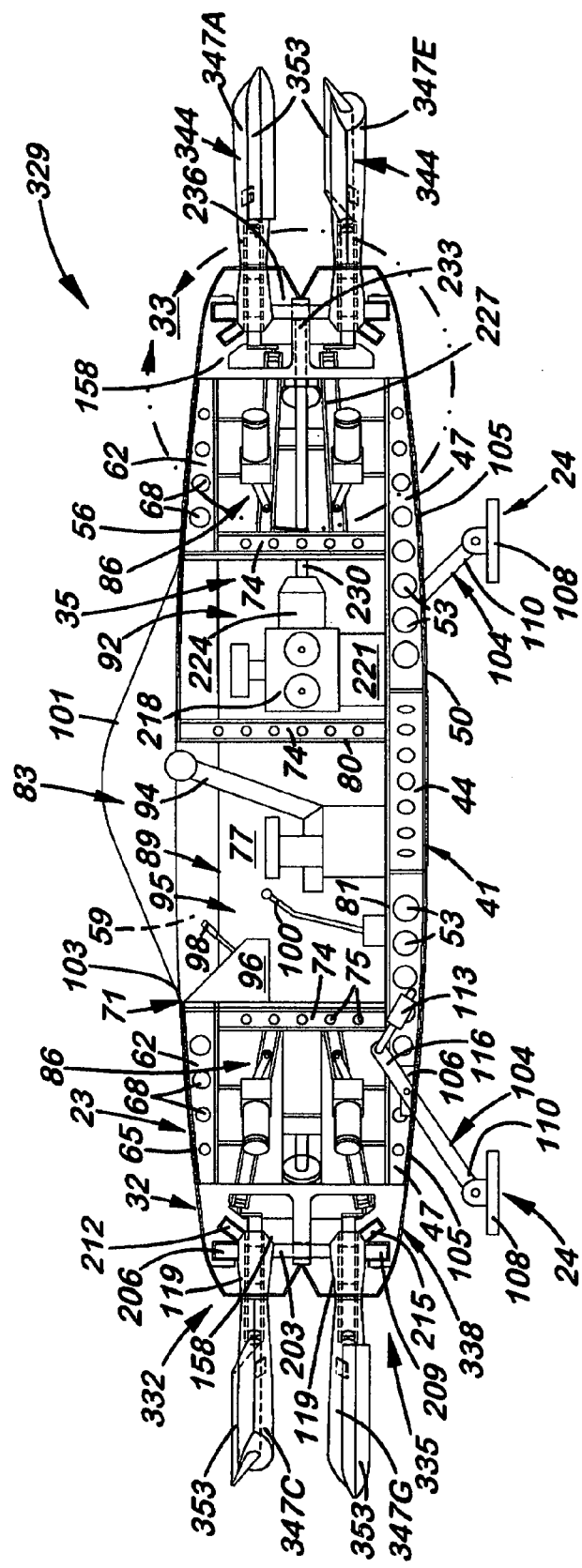
Figure 33:
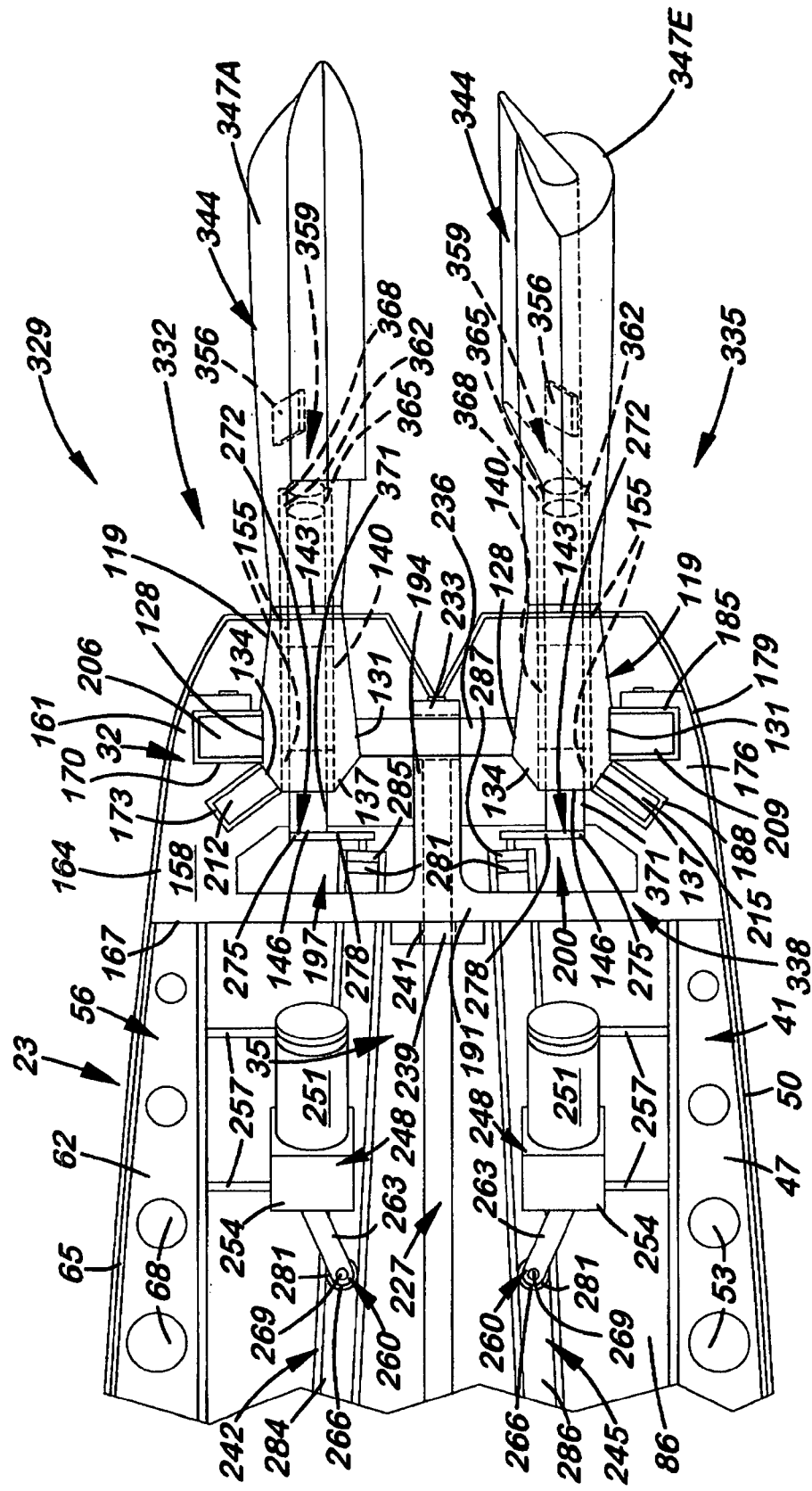
Figure 34:
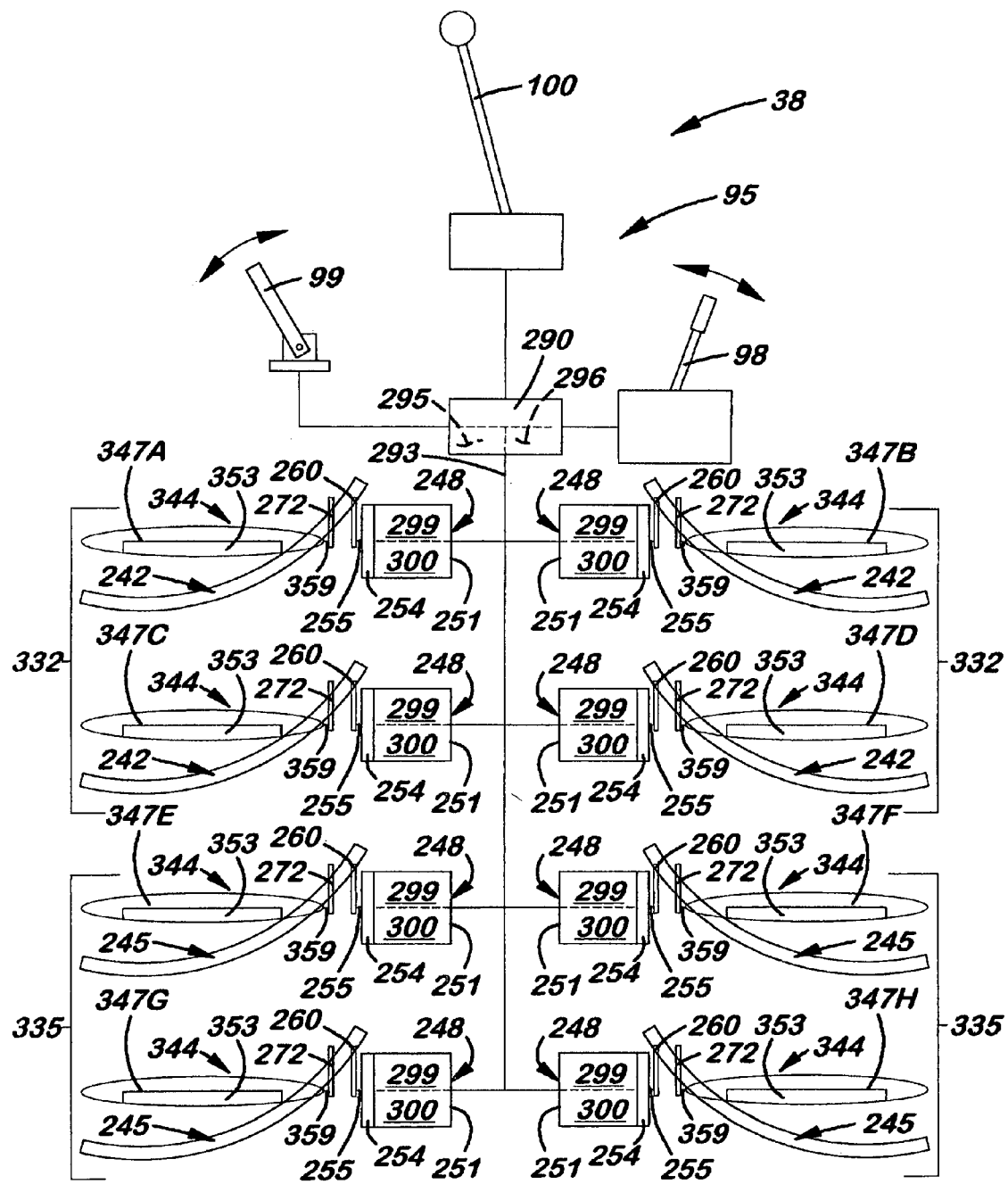

The best mode presently contemplated for carrying out the invention is illustrated in the accompanying drawings, in which:

FIG. 1 is a top plan view of a first embodiment rotorcraft in accordance with the present invention;

FIG. 2, a front elevational view of the rotorcraft;

FIG. 3, a fragmentary lateral horizontal sectional view of the rotorcraft to an enlarged scale taken on the line 3—3 of FIG. 2;

FIG. 4, a longitudinal vertical sectional view of the rotorcraft to an enlarged scale taken on the line 4—4 of FIG. 1;

FIG. 5, a fragmentary view of the rotorcraft to a further enlarged scale taken on the line 5—5 of FIG. 4;

FIG. 6, a schematic diagram of a first electrical control system for the rotorcraft;

FIG. 7, a top plan view of the rotorcraft with the rotor blades positioned for vertical movement of the rotorcraft;

FIG. 8, a front elevational view of the rotorcraft corresponding to FIG. 7;

FIG. 9, a top plan view of the rotorcraft with the rotor blades positioned for forward movement of the rotorcraft;

FIG. 10, a front elevational view of the rotorcraft corresponding to FIG. 9;

FIG. 11, a top plan view of the rotorcraft with the rotor blades positioned for rearward movement of the rotorcraft;

FIG. 12, a front elevational view of the rotorcraft corresponding to FIG. 11;

FIG. 13, a top plan view of the rotorcraft with the rotor blades positioned for left movement of the rotorcraft;

FIG. 14, a front elevational view of the rotorcraft corresponding to FIG. 13;

FIG. 15, a top plan view of the rotorcraft with the rotor blades positioned for right movement of the rotorcraft;

FIG. 16, a front elevational view of the rotorcraft corresponding to FIG. 15;

FIG. 17, a top plan view of the rotorcraft with the rotor blades positioned for upward pitching movement of the rotorcraft;

FIG. 18, a front elevational view of the rotorcraft corresponding to FIG. 17;

FIG. 19, a top plan view of the rotorcraft with the rotor blades positioned for right rolling movement of the rotorcraft;

FIG. 20, a front elevational view of the rotorcraft corresponding to FIG. 19;

FIG. 21, a top plan view of the rotorcraft with the rotor blades positioned for right yawing movement of the rotorcraft;

FIG. 22, a front elevational view of the rotorcraft corresponding to FIG. 21;

FIG. 23, a top plan view of a second embodiment rotorcraft in accordance with the present invention;

FIG. 24, a front elevational view of the rotorcraft of FIG. 23;

FIG. 25, a fragmentary lateral horizontal sectional view of the rotorcraft to an enlarged scale taken on the line 25—25 of FIG. 24;

FIG. 26, a longitudinal vertical sectional view of the rotorcraft to an enlarged scale taken on the line 26—26 of FIG. 23;

FIG. 27, a fragmentary view of the rotorcraft to a further enlarged scale taken on the line 27—27 of FIG. 26;

FIG. 28, a schematic diagram of a second electrical control system for the rotorcraft;

FIG. 29, a top plan view of a third embodiment rotorcraft in accordance with the present invention;

FIG. 30, a front elevational view of the rotorcraft of FIG. 29;

FIG. 31, a fragmentary lateral horizontal sectional view of the rotorcraft to an enlarged scale taken on the line 31—31 of FIG. 30;

FIG. 32, a longitudinal vertical sectional view of the rotorcraft to an enlarged scale taken on the line 32—32 of FIG. 29;

FIG. 33, a fragmentary view of the rotorcraft to a further enlarged scale taken on the line 33—33 of FIG. 32; and FIG. 34, a schematic diagram of a third electrical control system for the rotorcraft.

DETAILED DESCRIPTION OF THE ILLUSTRATED EMBODIMENTS

Referring to FIGS. 1–6, therein is shown a first embodiment rotorcraft in accordance with the present invention which provides controlled flight in all six degrees of freedom, designated generally at 20. The rotorcraft 20 includes a fuselage 23, a plurality of landing gear 24, and a rotor system comprised of a pair of counter-rotating upper and lower rotor blade assemblies 26 and 29, a rotor support assembly 32, a rotor drive system 35, and a rotor blade pitch control system 38.

The fuselage 23 shown is of a substantially circular shape as viewed from above and below, though other configurations are possible including elongate versions having multiple pairs of rotor blade assemblies 26 and 29 which are longitudinally or laterally spaced thereon. The fuselage 23 includes a circular lower frame 41 comprised of a lower annular frame 44 from which a plurality of radially-extending tapered floor beams 47 of an I-beam cross-section extend covered by a lower skin 50. The annular frame 44, the floor beams 47, and the lower skin 50, as well as the other components of the rotorcraft 20 are made of the appropriate cast, extruded, or sheet aluminum, titanium, steel, or other material such as composites or plastics. A plurality of variously sized lightening holes 53 extend through the floor beams 47. A circular upper frame 56 comprised of an upper annular frame 59 from which a plurality of radially-extending, tapered ceiling beams 62 of an I-beam cross-section extend covered by an upper skin 65. A plurality of variously sized lightening holes 68 extend through the ceiling beams 62. An annular upright frame 71 includes a plurality of upright beams 74 of I-beam cross-section which interconnect the lower and upper circular frames 41 and 56, with a plurality of lightening holes 75 extending through the upright beams 74. A peripheral interior wall 77 and a central firewall or divider wall 80 extend downwardly from the upper annular frame 59 along the upright beams 74 to a floor 81. The interior wall 77 divides the fuselage 23 into a circular central compartment 83 and an annular outer compartment 86. The divider wall 80 divides the central compartment 83 into respective pilot and engine compartments 89 and 92.

A pilot seat 94, and a flight control input device in the form of pilot operated controls 95 are located within the pilot compartment 89 of fuselage 23. The controls 95 are adapted to allow the pilot to input desired changes in direction, altitude, and attitude of what maneuvers are desired by the pilot in the form of input signals to the rotor blade pitch control system 38 of rotorcraft 20. The controls 95 include a control panel 96 including conventional flight instruments (not shown), a throttle lever 98 to control engine power, foot pedals 99 to control yaw, and a control stick 100 to control pitch and roll. Additionally, the control stick has a thumb switch (not shown) or similar input device which may be moved horizontally in any direction to control horizontal forward/rearward flight and left/right flight in any combination using the horizontal thrust component capability of the rotorcraft 20. These controls 95 work similarly to those in a conventional helicopter but with the additional capability of movement in all six degrees of freedom as explained subsequently. The flight control input device could easily be a remote transmitter operated on the ground by the pilot and a receiver (neither shown) mounted in the rotorcraft 20 for remote control operation of the rotorcraft 20. One or more externally facing video cameras and a video transmitter (neither shown) would facilitate flying remotely. A clear canopy 101 is hingedly connected to fuselage 23 using an elongate hinge 102 and lockable at a lock device 103.

Each landing gear 24 includes a leg 104 which extends through a respective key shaped opening 105 through lower skin 50 and is pivotally mounted to the fuselage 23 using respective brackets 106. A ground-contacting landing pad 108 is pivotally mounted to a lower end 110 of each leg 104 and a hydraulic cylinder 113 is connected between an upper end 116 of each leg 104 and fuselage 23.

The rotor blade assemblies 26 and 29 are typically in pairs of counter-rotating rotor blade assemblies driven to rotate in the opposite rotational directions at substantially the same rotational speed disposed in respective parallel rotational planes. Alternate configurations with 3, 4, 5, or more counter-rotating rotor blade assemblies are also possible, and/or multiple groups of counter-rotating rotor blade assemblies longitudinally and/or laterally spaced on the fuselage of the rotorcraft.

The rotor blade assemblies 26 and 29 are rotatably mounted to the fuselage 23 about a vertically disposed central axis which typically passes through or close to the center of gravity of rotorcraft 20 for stable operation thereof. The blade assemblies 26 and 29 each include a blade support ring or gear ring 119 and a plurality of radially-extending blade assemblies 122. The gear rings 119 are rotatably mounted to the fuselage 23 disposed at the outer periphery of the fuselage 23 and supported by the rotor support assembly 32. The gear rings 125 have a plurality of annular surfaces which may be smooth for use with wheels or toothed for use with gears. The annular surfaces shown comprise respective toothed upper and lower surfaces 128 and 131, and respective toothed angled inner surfaces 134 and 137. Respective pluralities of radial bores 140 extend through the gear rings 116 from an outer surface 143 to an inner surface 146 thereof.

The blade assemblies 122 each include an airfoil shaped blade 149 with a rotatable control shaft 152 affixed thereto extending longitudinally inwardly therefrom. The control shafts 152 are rotationally connected to respective of the gear rings 119 and adapted to control the lift versus drag of the blades 149 by varying the pitch angle thereof as explained subsequently. The blades 149 are mounted to the gear rings 119 with substantially the entire length of the blades 149 extending radially outwardly beyond the fuselage 23 to engage the ambient air. The blades 149 are designated 149 A–D on the rotor blade assembly 26 and 149 E–H on rotor blade assembly 29. The rotor blade assemblies 26 and 29 typically have equal numbers of blades 149 to provide balanced lift versus drag characteristics between the rotor blade assemblies 26 and 29. The shaft 152 is retained disposed through respective ball or needle bearings 155 affixed within respective of the radial bores 126. The blades 149 are pivotable about respective longitudinal axes to adjust a pitch angle thereof relative to the respective rotational planes of the rotor blade assemblies 26 and 29 to control the vertical and horizontal thrust components of each blade 149.

The rotor support assembly 32 includes a plurality of ring gear supports 158 affixed abutting the floor beams 47 and ceiling beams 62 of fuselage 23. Each ring gear support 158 includes an upper leg 161 having a curved upper surface 164 which is affixed to the respective ceiling beams 62, a rear surface 167, and a pair of vertical and angled gear receiving indents 170 and 173. A lower leg 176 has a curved lower surface 179 which is affixed to the respective floor beams 47 and a pair of vertical and angled gear receiving indents 185 and 188. A connecting leg 191 includes a center gear support portion 194 which extends parallel to the upper leg 161 and the lower leg 176, and a pair of clearance openings 197 and 200 which extend through connecting leg 191.

The gear rings 119 are rotationally supported in fuselage 23 passing through the plurality of ring gear supports 158 supported by a plurality of mating wheels or gears which are operatively connected to the fuselage 23. Respective of the toothed upper and lower surfaces 110 and 113 of the gear rings 119 face one another and are simultaneously engaged by a plurality of vertical spacer gears 203 disposed therebetween. The spacer gears 203 are rotationally mounted to the connecting leg 191 of the ring gear supports 158.

The upper and lower surfaces 110 and 113 of the gear rings 119 which are not engaged by the spacer gears 203 are engaged by a plurality of upper and lower vertical support gears 206 and 209 rotationally mounted within the respective indents 170 and 185. The support gears 206 and 209 retain the upper and lower surfaces 110 and 113 of the gear rings 95 and 98 in contact with the spacer gears 203 supported by and rotating in the respective parallel rotational planes within in the fuselage 23.

The angled inner surfaces 134 and 137 are engaged by a plurality of angled upper and lower support gears 212 and 215 which are rotationally mounted within the respective indents 173 and 188 to maintain the gear rings 119 in position supported by and rotating about the central axis within the fuselage 23.

The rotor drive system 35 includes a power device comprising an electric motor, gas turbine engine, or the illustrated piston type internal combustion engine 218 mounted to the floor 81 on an engine mount 221 within the engine compartment 92. The engine 218 receives fuel from a fuel tank 222 also mounted in the engine compartment 92. A transmission 224 is mounted to and driven by the engine 218 for transmitting power at a fixed or multiple gear ratios through a drive shaft 227 to the rotor blade assemblies 26 and 29. The drive shaft 227 has an input end 230 flexibly connected to the transmission 224 to allow for misalignment and an output end 233 which is affixed to a vertical drive gear 236 comprising one of the spacer gears 203 adapted to be connected to drive shaft 227 and be driven by the engine 218. The drive gear 236 simultaneously engages the upper and lower toothed surfaces 128 and 131 to positively drive the gear rings 119 in the opposite rotational directions. The output end 233 is supported by a support 239 on ball or needle bearings 241.

The rotor blade pitch control system 38 is operatively connected to the blades 149 and is adapted to control the vertical and horizontal thrust components of the blades 149 of the rotor blade assemblies 26 and 29. The control system 38 includes a pair of non-rotating, movable upper and lower pitch control rings 242 and 245, one for each gear ring 119, each being disposed radially inwardly of an associated one of the gear rings 119. The pitch control rings 242 and 245 are connected to the fuselage 23 through at least three of the actuators 248 spaced about a circumference thereof so as to be tiltable and vertically positionable by the actuators 248. The pitch control rings 242 and 245 are adapted to change the vertical and horizontal thrust components of the blades 149 throughout each revolution of each blade 149 about the fuselage 23. The blades 149 are operably slidably connected to respective of the control rings 242 and 245 whereby respective tilt and vertical positioning of the control rings 242 and 245 set by pilot input as explained subsequently. The control rings 242 and 245 shown are of a C-shaped cross-section, though other configurations are possible.

The actuators 248 each include an electric servo or stepping motor 251 affixed to a gear box 254. The actuators 248 have enough output torque through a rotary output shaft 255 thereof to adjust the pitch of the blades 149 A–D and E–H rapidly and are able to withstand the static and dynamic forces exerted on the blades 149 A–D and E–H during flight of the rotorcraft 20. The gear boxes 254 are mounted to the fuselage 23 using respective motor mounts 257.

The rotary output of actuators 248 is transmitted through respective inner thrust or pitch control arms 260 associated with each of the actuators 248. Each arm 260 has an input end 263 affixed to output shaft 255 and an output end 266 connected to respective inner walls 284 and 286 of the control rings 242 and 245 through coupling devices in the form of a ball joint 269 or other flexible joint. The control shafts 152 of the blades 149 are slidably connected to respective of the control rings 242 and 245 using respective outer thrust or pitch control arms 272. Respective output ends 275 of arms 272 are affixed to respective of the control shafts 152 for causing rotation thereof to control the vertical and horizontal thrust components of respective of the blades 149. Respective input ends 278 of arms 272 are attached through a slide device in the form of respective rollers 281 to respective of the control rings 242 and 245, being disposed in respective outer channels 285 and 287 of the control rings 242 and 245. The actuators 248 thus cause the control shafts 152 of the blades 149 to rotate to control the vertical and horizontal thrust components of the blades 149 during rotation of the rotor blade assemblies 26 and 29 about the gear rings 119.

The rotor blade pitch control system 38 further includes a controller in the form of a computer 290. The motors 251 of actuators 248 are electrically interconnected with the computer 290 through respective electrical cables (not shown). The computer 290 monitors the rotational location of each blade 149 relative to the fuselage 23 such as by receiving feedback signals from a plurality of sensors (not shown) which provide the feedback signals thereto. The sensors may be of the infrared type, the magnet and coil type, or the like having respective halves mounted in closely opposing manner to the inner surfaces 146 of gear rings 116 and to the ring gear supports 158 or fuselage 23. Such sensors are known in the electronic sensor industry to monitor the rotational position of shafts and the like. The actuators 248 also send feedback signals to the computer 290 indicative of the rotational position of the stepping motors 251 in conventional manner known in the electric motor industry.

The computer 290 controls the vertical and horizontal thrust components of each blade 149 throughout each revolution about the fuselage 23 based on input from the pilot through pilot controls 95 to control the actuators 248. The input from the computer 290 to the rotor blade control system 38 includes adjustments to the vertical and horizontal thrust components of each blade 149 based on input from the pilot through pilot controls 95 to execute the desired maneuvers of the rotorcraft 20. The computer 290 computes the pitch of each blade 149 required at each location during rotation of the upper and lower pitch control rings 242 and 245 to produce the vertical and horizontal thrust components necessary to execute the desired maneuvers. The computer 290 monitors the pitch of each blade 149 and continuously positions the electric actuators 248 as needed to produce the required pitch of each blade 149 at each rotational position about the fuselage 23. Communication between the computer 290 and the actuators 248 is through a plurality of electrical cables 293.

The design of the rotorcraft 20 differs significantly from previous helicopter, rotorcraft, and other aircraft designs because of the ability for movement in all six degrees of freedom: 1) up and down; 2) left and right; 3) forward and backward; (the first three being the orthogonal or XYZ coordinate positions); 4) roll; 5) pitch; and 6) yaw (the second three being the attitude positions) in any combination, and also being capable of hovering without any changes in any of the six degrees of freedom. Thus the rotorcraft 20 is able to move smoothly and directly, in a straight line, from any XYZ coordinate to any other XYZ coordinate in any attitudinal position of roll, pitch, or yaw. This is accomplished by utilizing the conventional lift versus drag characteristics of the airfoils of blades 149 at various pitch angles, both positive (i.e. the leading edge moved upwardly and the trailing edge moved downwardly relative to a neutral rotational plane of the blades), and negative (i.e. the leading edge moved downwardly and the trailing edge moved upwardly relatively to a neutral rotational plane of the blades). The neutral rotational plane of the blades 149 is when the blades 149 are at neither a positive nor negative pitch angle.

The blades 149 are adapted to produce variable lift and drag, or vertical and horizontal thrust components during operation based on the angle of attack thereof. As the angle of attack of a blade 149 is increased to a moderate angle of attack, for example up to about sixteen to twenty degrees from neutral (depending on the airfoil), the lift increases significantly but the drag increases only slightly. As the angle of attack is increased to a steep pitch angle, for example over twenty degrees from neutral (again, depending on the airfoil), the drag increases significantly and the lift increases more slowly, dropping to about zero when the airfoil stalls. The lift is the vertical thrust component of the blades 149 and the drag is the horizontal thrust component of the blades 149. The increased vertical thrust component tends to lift the fuselage 23 at the particular rotational position of the blade 149 about the fuselage 23. The increased horizontal thrust component tends to rotate the fuselage 23 about the vertically disposed central axis. When the blade 149 reaches an angle of attack at which the airfoil stalls (i.e. the laminar flow of the ambient air over the upper surface of the blade no longer adheres thereto and becomes turbulent), the vertical thrust component of the blade 149 drastically decreases to at or near zero, and the horizontal thrust component increases substantially. The pitch angle of blade 149 can be further increased to further increase the horizontal thrust component. The converse is true for negative pitch angles of blade 149 and is thus not further explained.

In the following FIGS. 7–22 examples of the six control functions for providing the six degrees of freedom are further explained. Note that the area outside the fuselage 23 is divided into sectors labeled "F" for front, "RE" for rear, "L" for left, and "R" for right. These areas are relative to the fuselage and move therewith. The rotor assemblies 26 and 29 in these examples are illustrated rotating in opposite rotational directions at substantially equal rotational speeds, though this is not an absolute requirement for alternate designs of the rotorcraft of the present invention.

Prior To Lift-Off: When the engine 218 is started and the pilot desires the rotorcraft 20 to remain on the ground with the rotor blade assemblies 26 and 29 turning, all of the blades 149 A–H are positioned equal zero or slightly negative pitch angles in all of the sectors "F", "R", "L", and "R" (see FIGS. 7–22 for sectors). This produces zero or a slightly negative vertical thrust component to maintain the rotorcraft 20 on the ground, and equal opposing horizontal thrust components between the rotor blade assemblies 26 and 29 so as to cause no yawing of the rotorcraft 20. This is accomplished by the actuators 248 positioning the control rings 242 and 245 in respective parallel neutral horizontal positions.

Lift Off and Hovering: Referring to FIGS. 7 and 8, when the pilot desires the rotorcraft 20 to lift off perpendicularly from the ground, all of the blades 149 A–H are positioned with equal moderate pitch angles in all of the sectors "F", "R", "L", and "R". This produces a positive vertical thrust component to lift the rotorcraft 20 off the ground as shown by arrow "A", and equal opposing horizontal thrust components between the rotor blade assemblies 26 and 29 so as to cause no yawing of the rotorcraft 20.

This is accomplished by the actuators 248 positioning the control rings 242 and 245 in respective parallel lowered horizontal positions below the neutral horizontal positions. The speed at which the rotorcraft 20 rises is controlled by increasing the throttle setting of the engine 218 to rotate the rotor blade assemblies 26 and 29 faster or slower, and the pitch angle of the blades 149. The higher the throttle setting and the greater the pitch, the more lift and the faster the upward acceleration of rotorcraft 20. To descend or land, the pitch angle of the blades is maintained equal, but gradually decreased and the engine 218 throttled back to decrease the vertical thrust components of the blades 149.

Forward Movement: Referring to FIGS. 9 and 10, when the pilot desires the rotorcraft 20 to move forwardly during flight, the pitch angle of each blade 149 A–D of the counter-clockwise rotating rotor blade assembly 26 increases to a steep pitch angle when in sector "L" and the pitch angle of each blade 149 E–H of the clockwise rotating rotor blade assembly 29 decreases to a moderate pitch angle when in sector "L". The pitch angle of each blade 149 A–D decreases to a moderate pitch angle when in sector "R" and the pitch angle of each blade 149 E–H increases to a steep pitch angle when in the sector "R".

This is accomplished by the actuators 248 positioning the control rings 242 and 245 in respective steep oppositely tilted positions along an axis centered through sectors "F" and "RE". Control ring 242 is tilted downwardly in sector "L" to increase the pitch angle and horizontal thrust component of blades 149 A–D while therein, and upwardly while in sector "R" to decrease the horizontal thrust component of blades 149 A–D while therein. Control ring 245 is tilted upwardly in sector "L" to decrease the pitch angle and horizontal thrust component of blades 149 E–H while therein, and downwardly while in sector "R" to increase the horizontal thrust component of blades E–H while therein. This produces a net forward thrust to propel the rotorcraft forwardly as shown by arrow "A1", and equal opposing horizontal thrust components between the rotor blade assemblies 26 and 29 so as to cause no yawing of the rotorcraft 20.

The pitch angle transitions of the blades 149 A–D and E–H in this and the other examples are made smoothly throughout each cycle of rotation about the fuselage 23. The greater the movement of the control rings 242 and 245, the greater the change in pitch angle and the resulting acceleration. The vertical position of the control rings 242 and 245 may also need some adjustment in all of the examples to compensate for changes in vertical thrust components of the blades 149 to maintain altitude.

Rearward Movement: Referring to FIGS. 11 and 12, when the pilot desires the rotorcraft 20 to move rearward during flight, the pitch angle of each blade 149 A–D of the counter-clockwise rotating rotor blade assembly 26 decreases to a moderate pitch angle when in the sector "L" and the pitch angle of each blade 149 E–H of the clockwise rotating rotor blade assembly 29 increases to a steep pitch angle when in the sector "L". The pitch angle of each blade 149 A–D increases to a steep pitch angle when in sector "R" and the angle of attack of each blade 149 E–H decreases to a moderate pitch angle when in the sector "R".

This is accomplished by the actuators 248 positioning the control rings 242 and 245 in respective steep oppositely tilted positions along an axis centered through sectors "F" and "RE". Control ring 242 is tilted upwardly in sector "L" to decrease the pitch angle and horizontal thrust component of blades 149 A–D while therein, and downwardly while in sector "R" to increase the horizontal thrust component of blades 149 A–D while therein. Control ring 245 is tilted downwardly in sector "L" to increase the pitch angle and horizontal thrust component of blades 149 E–H while therein, and upwardly while in sector "R" to decrease the horizontal thrust component of blades E–H while therein. This produces a net rearward thrust to propel the rotorcraft rearwardly as shown by arrow "A2", and equal opposing horizontal thrust components between the rotor blade assemblies 26 and 29 so as to cause no yawing of the rotorcraft 20.

Left Sideways Movement: Referring to FIGS. 13 and 14, when the pilot desires the rotorcraft 20 to move leftward during flight, the pitch angle of each blade 149 A–D of the counter-clockwise rotating rotor blade assembly 26 increases to a steep pitch angle when in the sector "RE" and the pitch angle of each blade 149 E–H of the clockwise rotating rotor blade assembly 29 decreases to a moderate pitch angle when in the sector "RE". The pitch angle of each blade 149 A–D decreases to a moderate pitch angle when in the sector "F" and the angle of attack of each blade 149 E–H increases to a steep pitch angle when in the sector "F".

This is accomplished by the actuators 248 positioning the control rings 242 and 245 in respective steep oppositely tilted positions along an axis centered through sectors "L" and "R". Control ring 242 is tilted downwardly in sector "RE" to increase the pitch angle and horizontal thrust component of blades 149 A–D while therein, and tilted upwardly in sector "F" to decrease the horizontal thrust component of blades 149 A–D while therein. Control ring 245 is tilted upwardly in sector "RE" to decrease the pitch angle and horizontal thrust component of blades 149 E–H while therein, and tilted downwardly in sector "F" to increase the horizontal thrust component of blades E–H while therein. This produces a net leftward thrust to propel the rotorcraft leftwardly as shown by arrow "A3", and equal opposing horizontal thrust components between the rotor blade assemblies 26 and 29 so as to cause no yawing of the rotorcraft 20.

Right Sideways Motion: Referring to FIGS. 15 and 16, when the pilot desires the rotorcraft 20 to move rightward during flight, the pitch angle of each blade 149 A–D of the counter-clockwise rotating rotor blade assembly 26 decreases to a moderate pitch angle when in the sector "RE" and the pitch angle of each blade 149 E–H of the clockwise rotating rotor blade assembly 29 increases to a steep pitch angle when in the sector "RE". The pitch angle of each blade 149 A–D increases to a steep pitch angle when in the sector "F" and the angle of attack of each blade 149 E–H decreases to a moderate pitch angle when in the sector "F".

This is accomplished by the actuators 248 positioning the control rings 242 and 245 in respective steep oppositely tilted positions along an axis centered through sectors "L" and "R". Control ring 242 is tilted upwardly in sector "RE" to decrease the pitch angle and horizontal thrust component of blades 149 A–D while therein, and tilted downwardly in sector "F" to increase the horizontal thrust component of blades 149 A–D while therein. Control ring 245 is tilted downwardly in sector "RE" to increase the pitch angle and horizontal thrust component of blades 149 E–H while therein, and tilted upwardly in sector "F" to decrease the horizontal thrust component of blades E–H while therein. This produces a net rightward thrust to propel the rotorcraft rightwardly as shown by arrow "A4", and equal opposing horizontal thrust components between the rotor blade assemblies 26 and 29 so as to cause no yawing of the rotorcraft 20.

Fore/Aft Pitch: Referring to FIGS. 17 and 18, when the pilot desires to pitch the front of the rotorcraft 20 downward and the rear upward during flight, the pitch angle of each blade 149 A–D of the counter-clockwise rotating rotor blade assembly 26 and each blade 149 E–H of the clockwise rotating rotor blade assembly 29 increases to a higher moderate pitch angle when in the sector "RE". The pitch angle of each blade 149 A–D and E–H decreases to a lesser moderate pitch angle (or even a negative moderate pitch angle) when in the sector "F".

This is accomplished by the actuators 248 positioning the control rings 242 and 245 in respective moderate parallel tilted positions along an axis centered through sectors "L" and "R". Control rings 242 and 245 are tilted downwardly in sector "RE" to increase the pitch angle and vertical thrust component of blades 149 A–D and E–H while therein, and tilted upwardly in sector "F" to decrease the vertical thrust component of blades 149 A–D and E–H while therein. This produces a net thrust to tilt the rotorcraft as shown by arrows "A5", and equal opposing horizontal thrust components between the rotor blade assemblies 26 and 29 so as to cause no yawing of the rotorcraft 20.

When the pilot desires to pitch the rear of the rotorcraft 20 downward and the front upward during flight, the process is reversed. The pitch angle of each blade 149 A–D of the counter-clockwise rotating rotor blade assembly 26 and each blade 149 E–H of the clockwise rotating rotor blade assembly 29 decreases to a lower moderate pitch angle (or even a negative moderate pitch angle) when in the sector "RE". The pitch angle of each blade 149 A–D and E-H increases to a greater moderate pitch angle when in the sector "F".

This is accomplished by the actuators 248 positioning the control rings 242 and 245 in respective moderate parallel tilted positions along the axis centered through sectors "L" and "R". Control rings 242 and 245 are tilted upwardly in sector "RE" to decrease the pitch angle and vertical thrust component of blades 149 A–D and E-H while therein, and tilted downwardly in sector "F" to increase the vertical thrust component of blades 149 A–D and E-H while therein. This produces a net thrust to tilt the rotorcraft opposite that shown by arrows "A5", and equal opposing horizontal thrust components between the rotor blade assemblies 26 and 29 so as to cause no yawing of the rotorcraft 20.

Side-To-Side Roll: Referring to FIGS. 19 and 20, when the pilot desires to pitch the right side of the rotorcraft 20 downward and the left side upward during flight, the pitch angle of each blade 149 A–D of the counter-clockwise rotating rotor blade assembly 26 and each blade 149 E–H of the clockwise rotating rotor blade assembly 29 increases to a higher moderate pitch angle when in the sector "L". The pitch angle of each blade 149 A–D and E–H decreases to a lesser moderate pitch angle (or even a negative moderate pitch angle) when in the sector "R".

This is accomplished by the actuators 248 positioning the control rings 242 and 245 in respective moderate parallel tilted positions along an axis centered through sectors "F" and "RE". Control rings 242 and 245 are tilted downwardly in sector "L" to increase the pitch angle and vertical thrust component of blades 149 A–D and E-H while therein, and tilted upwardly in sector "R" to decrease the vertical thrust component of blades 149 A–D and E-H while therein. This produces a net thrust to tilt the rotorcraft as shown by arrows "A6", and equal opposing horizontal thrust components between the rotor blade assemblies 26 and 29 so as to cause no yawing of the rotorcraft 20.

When the pilot desires to pitch the left side of the rotorcraft 20 downward and the right side upward during flight, the process is reversed. The pitch angle of each blade 149 A–D of the counter-clockwise rotating rotor blade assembly 26 and each blade 149 E–H of the clockwise rotating rotor blade assembly 29 decreases to a lower moderate pitch angle (or even a negative moderate pitch angle) when in the sector "L". The pitch angle of each blade 149 A–D and E-H increases to a greater moderate pitch angle when in the sector "R".

This is accomplished by the actuators 248 positioning the control rings 242 and 245 in respective moderate parallel tilted positions along the axis centered through sectors "L" and "R". Control rings 242 and 245 are tilted upwardly in sector "L" to decrease the pitch angle and vertical thrust component of blades 149 A–D and E-H while therein, and tilted downwardly in sector "R" to increase the vertical thrust component of blades 149 A–D and E-H while therein. This produces a net thrust to tilt the rotorcraft opposite that shown by arrows "A6", and equal opposing horizontal thrust components between the rotor blade assemblies 26 and 29 so as to cause no yawing of the rotorcraft 20.

Clockwise/Counter-Clockwise Yaw: Referring to FIGS. 21 and 22, when the pilot desires to yaw the rotorcraft 20 rightward during flight, the pitch angle of each blade 149 A–D of the counter-clockwise rotating rotor blade assembly 26 increases to equal steep pitch angles in all of the sectors "F", "R", "L", and "R". The pitch angle of each blade 149 E–H of the clockwise rotating rotor blade assembly 29 stay at the same equal moderate pitch angles in all of the sectors "F", "R", "L", and "R".

This is accomplished by the actuators 248 positioning the control ring 242 and 245 in parallel, respectively lowered and slightly raised horizontal positions relative to the neutral horizontal positions to increase the pitch angle and horizontal thrust components of blades 149 A–D while maintaining that of blades 149 E–H. This produces unequal opposing horizontal thrust components between the rotor blade assemblies 26 and 29, with a net rightward yawing thrust to propel the rotorcraft spinning rightwardly as shown by arrow "A7".

When the pilot desires to yaw the rotorcraft 20 leftward during flight, the process is reversed. The pitch angle of each blade 149 A–D of the counter-clockwise rotating rotor blade assembly 26 stay at the same equal moderate pitch angles in all of the sectors "F", "R", "L", and "R". The pitch angle of each blade 149 E–H of the clockwise rotating rotor blade assembly 29 increases to equal steep pitch angles in all of the sectors "F", "R", "L", and "R".

This is accomplished by the actuators 248 positioning the control rings 242 and 245 in parallel, respectively slightly raised and lowered horizontal positions relative to the neutral horizontal positions to maintain the pitch angle of blades 149 A–D and increase the pitch angle and horizontal thrust components of blades 149 E–H. This produces unequal opposing horizontal thrust components between the rotor blade assemblies 26 and 29, with a net leftward yawing thrust to propel the rotorcraft spinning leftwardly opposite that shown by arrow "A7".

Complex Movements: The rotorcraft 20 may be maneuvered in various combinations of the above examples by positioning the control rings 242 and 245 as needed to produce the desired combination of vertical and horizontal thrust components.

The precise individual control of the vertical and horizontal thrust components of each blade 149 (even more independently controllable in the second embodiment following) allows the pilot of the rotorcraft 20 to compensate for turbulence, and varying wind conditions such as wind gusts. For example, if a prevailing wind is present prior to take-off which could lift the upwind side of the rotorcraft 20 during take-off and possibly flipping over the rotorcraft 20, a small amount of negative pitch angle my be applied to the blades 149 A–D and E–H passing through the upwind of sector of the rotorcraft 20 prior to take-off while warming up the engine 218 to keep the rotorcraft 20 firmly on the ground. Upon lift-off and flight of the rotorcraft 20, positive and negative pitch angles may be utilized to compensate for prevailing wind, wind gusts, and any other undesired wind interference regardless of the speed, direction, attitude, or proximity to obstacles encountered during flight.

Referring to FIGS. 23–28, therein is shown a second embodiment rotorcraft 302 in accordance with the present invention which provides controlled flight in all six degrees of freedom. The rotorcraft 302 comprises the circular fuselage 23, the plurality of landing gear 24, the pair of counter-rotating rotor blade assemblies 26 and 29, the rotor support assembly 32, the rotor drive system 35, and a rotor blade pitch control system 305.

The rotor blade pitch control system 305 is similar to the rotor blade pitch control system 38 and effects control of the rotorcraft in the same manner, except that the pair of upper and lower pitch control rings 242 and 245 are not utilized. Rather, the actuators 248 are mounted directly to respective of the gear rings 119 of rotor blade assemblies 26 and 29 for rotation therewith using respective motor mounts 310. The actuators 248 are operably connected to respective of the control shafts 152 to control rotation of the control shafts 152 by the output shafts 255 of the actuators 248 being directly connected to shaft 152 through a coupling 311 therebetween.

The rotor blade pitch control system 305 utilizes a controller in the form of a computer 314 which works like the computer 290 including monitoring the rotational location of each blade 149 relative to the fuselage 23 and the pitch angle of each blade 149 as explained above, but is adapted for directly controlling the individual blades 149 rather than through the control rings 242 and 245. This allows totally individual control of the pitch angle and thus the vertical and horizontal thrust components of each blade 149.

Since the computer 314 is located in the pilot compartment 89, and the actuators 248 are attached to rotate with respective of the gear rings 119, communication therebetween cannot be directly only through a plurality of electrical cables. Therefore, the motors 251 of the actuators 248 are electrically interconnected with the computer 314 through a plurality of electrical cables 317 which extend radially of the fuselage 23. An electrical ring and brush arrangement includes respective brush assemblies 320 which extend from the actuators 248 to conduct electricity to power the motors 251, and conduct electrical signals to and from the motors 251. An annular electrically conductive ring assembly 323 comprised of a plurality of electrically isolated conductive rings (not shown) is mounted to the ring gear supports 158 using a plurality of mounting brackets 326. The brush assemblies 320 continuously contact the conductive rings of the ring assembly 323 to permit continuous electrical interconnection between the computer 314 and the actuators 248 during rotation of the rotor blade assemblies 26 and 29 about the fuselage 23.

Alternatively, a wireless communication arrangement such as digital wireless communication devices (not shown) may be used to communicate between the motors 251 of actuators 248 and the computer 314. Electrical power must still be supplied to power the motors 251 through an electrical ring and brush arrangement as described above, or other such arrangement. In such a wireless communication arrangement, the computer 314 includes a transmitter 295 and a receiver 296, and the actuators 248 include respective transmitters 299 and receivers 300. Such digital wireless communication is currently well developed in the cellular phone industry and in the rapidly evolving wireless internet industry. The distance between the transmitters 295 and 299, and the respective receivers 296 and 300 is only a few feet such that radiant power loss from the transmitters 295 and 299 is minimal. Therefore, the transmitters 295 and 299 can be of relatively low power.

Further alternatively, other types of rapid communication devices (not shown) for bi-directionally moving the relatively large amount of data between the computer 314 and the actuators 248 may be used.

Referring to FIGS. 29–34, therein is shown a third embodiment rotorcraft 329 in accordance with the present invention which provides controlled flight in all six degrees of freedom. The rotorcraft 329 comprises the circular fuselage 23, the plurality of landing gear 24, a pair of counter-rotating rotor blade assemblies 332 and 335, the rotor support assembly 32, the rotor drive system 35, and a rotor blade pitch control system 338 which is the same as rotor blade pitch control system 38 except for a different controller in the form of a computer 341, and thus not further explained.

The rotor blade assemblies 332 and 335 each include a pair of the gear rings 119 and a plurality of blade assemblies 344. The rotor blade assemblies 344 each include a plurality of radially-extending airfoil shaped blades 347 fixedly mounted to the gear rings 125 at a fixed pitch about the respective longitudinal axes. The blades 247 are similar to blades 149 but with a flap slot 350 and respective flaps 353 pivotally mounted at the trailing edges of the blades 247. The flaps 353 are disposed within respective of the flap slots 350 using a plurality of hinges 356. The flaps 353 pivot to adjust the effective pitch angle of the blades 347 relative to the respective rotational planes of the rotor blade assemblies 332 and 335 to change the vertical and horizontal thrust components of each blade 247. The blades 347 are designated 347 A–D on the blade assembly 332 and 347 E–H on blade assembly 344. The blade assemblies 332 and 335 typically have equal numbers of blades 247 as do rotor blade assemblies 26 and 29 above.

Each of the blade assemblies 344 has a rotatable control shaft 359 extending longitudinally inwardly therefrom rotationally connected to respective of the support rings 119 adapted to control the vertical and horizontal thrust components of respective of the blades 347. The control shafts 359 extend through the radial bores 126 of gear rings 119 and through a longitudinal bore 362 each of respective blades 347. The control shafts 359 are disposed through respective ball or needle bearings 365 and retained disposed through respective of bearings 155 affixed within respective of the radial bores 126 of the gear rings 119 and the longitudinal bores 362 of blades 347. Respective distal ends 368 of shafts 359 are affixed directly to the flaps 353 where they pivot on brackets 356 or through gears or arms (not shown) such that flaps 353 rotate as controlled by rotation of shafts 359. Respective proximal ends 371 of shafts 359 are affixed to the output end 278 of arms 272 of the rotor blade pitch control system 338 for control by the upper and lower pitch control rings 242 and 245. The blades 347 are adapted to produce variable vertical and horizontal thrust components during operation based on the effective pitch angle of the blades 347 by moving the flaps 353 to execute desired maneuvers of the rotorcraft 20 as explained below.

The rotor blade pitch control system 305 utilizes a controller in the form of a computer 341 which works like the computer 290 including monitoring the rotational location of each blade 347 relative to the fuselage 23, and the effective pitch angle of each blade 347 by monitoring the position of each flaps 353. The computer 341 computes the required position for each flap 353 to achieve the effective pitch of each blade 347, similarly to the computing the required pitch angle for each blade 149. The computer 341 positions the electric actuators 248 as needed to produce the required vertical and horizontal thrust components of the blades 347. Communication between the computer 341 and the actuators 248 is by the plurality of electrical cables 293.

The blades 347 are adapted to produce variable lift and drag, or vertical and horizontal thrust components during operation based on the effective pitch angles thereof. As the angle of the flap 353 of a blade 347 is increased to a moderate angle, for example up to about sixteen to twenty degrees from neutral (depending on the airfoil), the lift increases significantly but the drag increases only slightly. As the angle of the flap 353 is increased to a steep angle, for example over twenty degrees from neutral (again, depending on the airfoil), the drag increases significantly and the lift increases more slowly, dropping to about zero when the airfoil stalls. This functions to permit control of the rotorcraft 20 as explained in detail above, but with the angle of attack of blades 149 replaced by the effective angle of attack of blades 347 as determined by the fixed angle of the blades 347 and the angular position of the flaps 353 (both positive and negative angles). The blades

347 are typically affixed to the gear rings 119 at a neutral angle of attack to allow full positive and negative effective angles of attack for blades 347.

A method for providing flight for the rotorcraft 23 in all six degrees of freedom includes the steps of: 1) providing a rotorcraft having at least two rotor blade assemblies which are rotatable about a vertically disposed central axis, each rotor blade assembly having a plurality of radially-extending airfoil shaped blades of variable horizontal and vertical thrust components; 2) powering the rotor blade assemblies to rotate in opposite rotational directions to effect flight of the rotorcraft; and 3) controlling the horizontal and vertical thrust components of each blade throughout each revolution about the rotorcraft to execute desired maneuvers of the rotorcraft.

The step of controlling the horizontal and vertical thrust components may include monitoring respective rotational locations of each blade about the rotorcraft. The step of controlling the horizontal and vertical thrust components may be effected by varying respective pitch angles of the blades about respective longitudinal axes of the blades relative to a rotational plane of the rotor blade assembly. Alternatively, or in combination, the step of controlling the horizontal and vertical thrust components may be effected by varying respective pitch angles of flaps pivotally mounted to fixed pitch blades disposed generally parallel to respective longitudinal axes of the blades relative to a rotational plane of the rotor blade assembly.

Therefore, it is readily apparent that the rotorcraft, the rotor system for rotorcraft, and the method of the present invention solves the problems with the prior art helicopters, rotorcraft, and other types of aircraft. Firstly, the rotorcraft provides a level of controllability not approached in the prior art, allowing flight in all six degrees of freedom of: 1) pitch; 2) roll; 3) yaw; 4) up/down; 5) forward/rear; and 6) left/right, and any combination thereof. This permits the precise flying particularly needed in areas where flying space is at a premium such as during low hovers and flight adjacent obstructions such as buildings, bridges, towers, and sides of mountains. The rotorcraft also provides a more robust alternative to the pitch control mechanism of helicopters and rotorcraft which is less prone to mechanical failure such as due to stresses placed on the blades. The ring gears are robust and positively rotationally built into the rotorcraft. The ring gears allow the blades which extend radially therefrom to be much shorter than those of helicopters. This provides more efficient lifting typically with less required blade are since the rotational velocity is higher at this radial distance from the vertically disposed central axis. The shorter length of the blades and typically less required blade area make flight of the rotorcraft less prone to disruption due to encountering turbulent air. Likewise, the superior maneuverability of the rotorcraft makes recovery from turbulent air significantly easier and quicker. The rotorcraft produces a downwash of doughnut shaped horizontal cross-section which dissipates more quickly than the downwash created by the main rotor of helicopters. This facilitates flight of the rotorcraft particularly when the downwash of the blades is directed onto a closely disposed surface such as during take-off, landing, and hovering close to the ground, and maneuvering by the side of a vertical structure such as buildings or a mountain such as during mountain rescue work. This also facilitates flight of other aircraft flying through or near the downwash. Finally, unlike helicopters, the cabin of the rotorcraft may be made as large and non-streamlined as desired. This is done merely by increasing the diameter of the gear rings. There is no absolute requirement to minimize drag since the downwash produced by the blades do not pass directly over the fuselage. The gear rings can even enclose a space larger than a baseball diamond with no adverse downwash effect. An extremely large rotorcraft is thus very feasible alone or in combination with a lighter-than-air gas enclosed in an added structure of the fuselage.

Many variations to the rotorcraft, the rotor system for rotorcraft, and the method of the present invention. For example, while the fuselage shown is circular in shape, other shapes and constructions may be used such as longitudinally elongated. While this shape might cause some loss of maneuverability and control of the rotorcraft, a large speed advantage may be achieved due to the more streamlined shape while retaining the VTOL capability. Longitudinally oriented jet engines could also be added to the fuselage to add direct forward thrust for further speed during cruising. Another example is the use of the flaps in combination with the variable pitch blades to further refine vertical and horizontal thrust control of the blades. Yet another example is the use a plurality of flaps on each blade, and/or using large flaps on the upper and/or lower surfaces of the blades rather than at the trailing edge thereof. Leading edge slats, split flaps, or other such conventional devices may be used which alter the lift vs. drag ratio of the blades. A further example is having the control shafts affixed to the gear rings with the blades pivotally mounted to the control shaft for rotation about the longitudinal axis. A still further example, exact rotational synchronicity between the two counter-rotating rotor blade assemblies is not necessary as long as the speeds are close. Therefore, wheels may be used to drive the rotor blade assemblies instead of the gears shown. Yet a further example is the design and layout of the central compartment of the fuselage shown may be changed as desired, especially so if the rotorcraft is flown by remote control from the ground. The rotor system could even be designed as part of a heavy lifting rotorcraft which includes a large helium or hot air balloon, blimp, or the like which does the main lifting work. Other examples include the controls may be other than the generally typical aircraft-type stick, foot pedals, and throttle shown. For example, a single fighter-type joy stick with a pull trigger may be used to replace the stick, pedals, and throttle. The joy stick pivots for the stick functions and has a thumb switch for horizontal flight, rotates for the pedal functions, and the trigger operates the throttle functions. Different types of landing gear other than the Vertical Take-Off and Landing (VTOL) type shown may be used such as wheeled tricycle landing gear with a steerable front wheel as used on light aircraft to allow taxiing of the rotorcraft. The actuators may be of a hydraulic or other type with a hydraulic pump powered by a power take-off of the transmission. Electrical power to run the electric actuators may be supplied using slip-rings or even induction. The rotorcraft may be powered by other types of power devices such as one or more electric motors rather than the turbine or piston engines. The electricity to power the motors might be derived from a conventional fuel cell or solar cells covering the top skin of the rotorcraft. Large solar cell covered wings may be utilized and a compartment for cameras and telemetry equipment.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A rotorcraft which provides controlled flight in all six degrees of freedom, comprising:
 a fuselage;

at least two rotor blade assemblies rotatably mounted to said fuselage about a vertically disposed central axis, each rotor blade assembly having a plurality of radially-extending airfoil shaped blades adapted to produce variable vertical and horizontal thrust components during operation;

a rotor drive system mounted to said fuselage and including a power device adapted for rotationally driving said rotor blade assemblies in opposite rotational directions;

a rotor blade control system operatively connected to said blades adapted to control said vertical and horizontal thrust components of said blades of said rotor blade assemblies including a controller adapted to monitor the rotational location of each blade relative to said fuselage and input signals indicative of required vertical and horizontal thrust components of each blade to blade control devices adapted to change said vertical and horizontal thrust components of said blades throughout each revolution of each blade about said fuselage; and a flight control input device operable by a pilot of the rotorcraft adapted to input desired changes in direction, altitude, and attitude of the rotorcraft to said controller of what maneuvers are desired by the pilot, whereby said input signals from said controller to said rotor blade control system include adjustments to said vertical and horizontal thrust components of each blade to execute said desired maneuvers of the rotorcraft.

2. The rotorcraft of claim 1, wherein the blades are pivotable about respective longitudinal axes to adjust a pitch angle thereof relative to a rotational plane of the rotor blade assembly to control the vertical and horizontal thrust components of each blade.

3. The rotorcraft of claim 1, wherein the blades include respective flaps pivotally mounted thereto each adapted to adjust an effective pitch angle of said blades relative to a rotational plane of the rotor blade assembly to control the vertical and horizontal thrust components of each blade.

4. The rotorcraft of claim 3, wherein the flaps are pivotally mounted at respective trailing edges of the blades.

5. The rotorcraft of claim 4, wherein the flaps are pivotally mounted at the trailing edges of the blades disposed within respective flap slots.

6. The rotorcraft of claim 1, wherein each rotor blade assembly includes a blade support ring to which the blades are mounted extending radially outwardly therefrom, said support rings being rotatably mounted to the fuselage by a rotor support assembly.

7. The rotorcraft of claim 6, wherein the rotor blade assemblies are in pairs of counter-rotating rotor blade assemblies driven to rotate in the opposite rotational directions disposed in respective parallel rotational planes.

8. The rotorcraft of claim 7, wherein the pairs of counter-rotating rotor blade assemblies have equal numbers of blades.

9. The rotorcraft of claim 7, wherein the pairs of counter-rotating rotor blade assemblies are driven to rotate in opposite rotational directions at substantially the same rotational speed.

10. The rotorcraft of claim 9, wherein the blade support rings of each pair of counter-rotating rotor blade assemblies comprise respective upper and lower rings, said upper ring having an annular lower surface and said lower ring having an annular upper surface which faces said annular lower surface, said annular upper and lower surfaces being simultaneously engaged by respective outer peripheries of a plurality of vertical spacer wheels disposed therebetween which are operably connected to the fuselage, at least one of said vertical spacer wheels comprising a vertical drive wheel adapted to be driven by the power device to drive said upper and lower rings in opposite rotational directions.

11. The rotorcraft of claim 10, wherein the upper and lower rings comprise respective upper and lower gear rings, the lower surface of said upper gear ring comprising an annular toothed lower surface and the upper surface of said lower gear ring comprising an annular toothed upper surface, the vertical spacer wheels comprise respective externally toothed vertical spacer gears, and the vertical drive wheel comprises an externally toothed vertical drive gear, said annular upper and lower toothed surfaces being simultaneously engaged by said vertical spacer gears and said directions.

12. The rotorcraft of claim 10, wherein the upper and lower rings of each pair of counter-rotating rotor blade assemblies includes both an upper and a lower surface and at least one annular angled inner surface, said annular angled inner surfaces and said upper and lower surfaces which are not engaged by the spacer wheels and drive wheel being engaged by respective angled guide wheels which are operably connected to the fuselage to maintain said upper and lower rings in position supported by and rotating about the central axis of said fuselage.

13. The rotorcraft of claim 12, wherein the upper and lower rings comprise respective upper and lower gear rings each of which includes both annular upper and lower surfaces and at least one annular angled inner surface, said upper and lower surfaces of said upper and lower gear rings comprise respective annular toothed upper and lower surfaces, the vertical guide wheels comprise respective externally toothed vertical guide gears, the vertical drive wheel comprises an externally toothed vertical drive gear, said annular upper and lower toothed surfaces being simultaneously engaged by said vertical guide gears and said vertical drive gear to positively drive said gear rings in the opposite rotational directions, the annular angled inner surfaces comprise annular toothed angled inner surfaces, and the angled guide wheels comprise respective externally toothed angled guide gears to positively engage said gear rings.

14. The rotorcraft of claim 12, wherein the rotor support assembly includes a plurality ring gear supports affixed to the fuselage, each ring gear support adapted to rotationally support the spacer wheels, the drive wheel, and the guide wheels.

15. The rotorcraft of claim 6, wherein each of the blades has a rotatable control shaft extending longitudinally inwardly therefrom rotation of which by a corresponding one or more of the blade control devices sets the vertical and horizontal thrust components of said blade.

16. The rotorcraft of claim 15, wherein the control devices are mounted to the fuselage inside of the support rings, and the rotor blade control system includes a non-rotating control ring for each gear ring, each of said control rings being disposed radially inwardly of an associated one of said gear rings and connected to the fuselage through at least three of said control devices spaced about a circumference thereof so as to be tiltable and vertically positionable by said control devices, the blades being operably slidably connected to respective of said control rings whereby respective tilt and vertical positioning of said control rings as set by pilot input through the controller and said control devices rotates respective of the control shafts of said blades to control the vertical and horizontal thrust components of respective of said blades during rotation of said rotor blade assemblies about said control rings.

17. The rotorcraft of claim 16, wherein each control device has a rotary output shaft, an inner thrust control arm being associated with each of said control devices having an input end affixed to said rotary output shaft and an output end operatively connected to respective of the control rings through a coupling device, and the control shafts of said blades being operably slidably connected to respective of the control rings using respective outer thrust control arms each having an input end attached through a slide device to respective of said control rings, and an output end affixed to respective of said control shafts for causing rotation thereof to control the vertical and horizontal thrust components of respective of said blades.

18. The rotorcraft of claim 15, wherein the control devices of the rotor blade control system are each mounted to a corresponding one of the support rings for rotation therewith and operably connected to respective of the control shafts to control rotation of said control shafts.

19. The rotorcraft of claim 18, wherein the control devices include respective electric servo-motors which are electrically interconnected with the controller through an electrical ring and brush arrangement.

20. The rotorcraft of claim 18, wherein the control devices include respective electric servo-motors which are electrically interconnected with the controller through a wireless communication arrangement.

21. The rotorcraft of claim 6, wherein the fuselage is of a substantially circular shape as viewed from above and below, and the support rings are disposed at an outer periphery of said fuselage with substantially an entire length of said blades extending radially outwardly beyond said fuselage.

22. The rotorcraft of claim 6, wherein the flight control input device comprises pilot operated controls located within the fuselage, said pilot operated controls including a control stick and foot pedals adapted to allow control of the pitch angle of the blades, and a throttle lever adapted to allow control of power output from the primer mover to the rotor blade assemblies.

23. A rotor system for rotorcraft which provides controlled flight in all six degrees of freedom, comprising:
   at least two rotor blade assemblies rotatably mountable to the rotorcraft about a vertically disposed central axis, each rotor blade assembly having a plurality of radially-extending airfoil shaped blades adapted to produce variable vertical and horizontal thrust components during operation;
   a rotor drive system mounted to the rotorcraft and including a power device adapted for rotationally driving said rotor blade assemblies in opposite rotational directions;
   a rotor blade control system operatively connected to said blades adapted to control said vertical and horizontal thrust components of said blades of said rotor blade assemblies including a controller adapted to monitor the rotational location of each blade relative to the rotorcraft and input signals indicative of required vertical and horizontal thrust components of each blade to blade control devices adapted to change said vertical and horizontal thrust components of said blades throughout each revolution of each blade about the rotorcraft; and
   a flight control input device operable by a pilot of the rotorcraft adapted to input desired changes in direction, altitude, and attitude of the rotorcraft to said controller of what maneuvers are desired by the pilot, whereby said input signals from said controller to said rotor blade control system include adjustments to said vertical and horizontal thrust components of each blade to execute said desired maneuvers of the rotorcraft.

24. The rotor system of claim 23, wherein the blades are pivotable about respective longitudinal axes to adjust a pitch angle thereof relative to a rotational plane of the rotor blade assembly to control the vertical and horizontal thrust components of each blade.

25. The rotor system of claim 23, wherein the blades include respective flaps pivotally mounted thereto each adapted to adjust an effective pitch angle of said blades relative to a rotational plane of the rotor blade assembly to control the vertical and horizontal thrust components of each blade.

26. The rotor system of claim 25, wherein the flaps are pivotally mounted at respective trailing edges of the blades.

* * * * *